United States Patent
Bao et al.

(10) Patent No.: US 12,197,279 B2
(45) Date of Patent: Jan. 14, 2025

(54) MEMORY FAULT HANDLING METHOD AND APPARATUS

(71) Applicant: Huawei Technologies Co., Ltd., Shenzhen (CN)

(72) Inventors: Quanyang Bao, Shenzhen (CN); Lin Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 18/164,402

(22) Filed: Feb. 3, 2023

(65) Prior Publication Data

US 2023/0185659 A1    Jun. 15, 2023

Related U.S. Application Data

(63) Continuation of application No. PCT/CN2021/105645, filed on Jul. 12, 2021.

(30) Foreign Application Priority Data

Aug. 5, 2020  (CN) .......................... 202010778351.0
Aug. 19, 2020  (CN) .......................... 202010839242.5

(51) Int. Cl.
  *G06F 11/00*  (2006.01)
  *G06F 11/07*  (2006.01)

(52) U.S. Cl.
  CPC ...... *G06F 11/0793* (2013.01); *G06F 11/0757* (2013.01); *G06F 11/076* (2013.01)

(58) Field of Classification Search
  CPC . G06F 11/0993; G06F 11/0757; G06F 11/076
  See application file for complete search history.

(56) References Cited

U.S. PATENT DOCUMENTS 6,408,407 B1 *  6/2002  Sadler ................ G06F 11/0736
                                                          714/48
8,930,764 B2 *  1/2015  Deshpande ......... G06F 11/0793
                                                          714/38.1

(Continued)

OTHER PUBLICATIONS

Baseman, Elisabeth et al: "Improving DRAM Fault Characterization Through Machine Learning", 2016 46TH Annual IEEE/IFIP International Conference on Dependable Systems and Networks Workshops (DSN-W), IEEE, Jun. 28, 2016 (Jun. 28, 2016), pp. 250-253, XP032973384.

(Continued)

*Primary Examiner* — Esaw T Abraham
(74) *Attorney, Agent, or Firm* — Slater Matsil, LLP

(57) ABSTRACT

This application provide a memory fault handling method and apparatus, and relate to the field of computer technologies, to resolve a problem, in the conventional technology, that a system breaks down due to a memory fault. A specific solution is as follows: A management module obtains error information of a memory. The management module determines, based on the error information of the memory by using a machine learning algorithm, a fault feature mode of the memory or an isolation repair technology used to repair the memory. The management module determines, based on the fault feature mode of the memory or the isolation repair technology used to repair the memory, to repair the memory by using at least one of hardware isolation or software isolation.

20 Claims, 9 Drawing Sheets

(56) References Cited

U.S. PATENT DOCUMENTS

| | | | |
|---|---|---|---|
| 10,235,242 B2 * | 3/2019 | Wright | H01L 25/0657 |
| 11,726,873 B2 * | 8/2023 | Hong | G06F 11/1068 |
| | | | 714/764 |
| 2011/0138219 A1 | 6/2011 | Walton et al. | |
| 2020/0162950 A1 * | 5/2020 | Blake | H04L 41/065 |

OTHER PUBLICATIONS

Xiaoming Du et al: "Memory Failure Prediction Using Online Learning", Memory Systems, ACM, 2 Penn Plaza, Suite 701New Yorkny 10121-0701USA, Oct. 1-4, 2018, 12 pages, XP058424039.
Giurgiu, Ioana et al: "Predicting DRAM Reliability in the Field with Machine Learning", Proceedings of the 18TH ACM/IFIP/USENIX Middleware Conference on Industrial Track, Middleware "17, Dec. 11-15, 2017, pp. 15-21, XP093007530.

\* cited by examiner

MEMORY FAULT HANDLING METHOD AND APPARATUS

CROSS-REFERENCE TO RELATED APPLICATIONS

This application is a continuation of International Application No. PCT/CN2021/105645, filed on Jul. 12, 2021, which claims priority to Chinese Patent Application No. 202010839242.5, filed on Aug. 19, 2020, and Chinese Patent Application No. 202010778351.0, filed on Aug. 5, 2020. All of the aforementioned patent applications are hereby incorporated by reference in their entireties.

TECHNICAL FIELD

Embodiments of this application relate to the field of computer technologies, and in particular, to a memory fault handling method and apparatus.

BACKGROUND

A dynamic random access memory (DRAM) is a common random access memory, and is widely used in the storage field. As a capacity of the DRAM memory increases, a basic failure rate increases. Generally, after a memory error occurs, an error correction algorithm such as error checking and correction (ECC) may be used to correct the error. However, frequent error correction affects system performance. In addition, when a memory fault becomes more serious, the error correction algorithm is overloaded, and a probability of an uncorrected error increases greatly. As a result, the uncorrected error may occur, causing system breakdown.

A memory repair method is to accumulate values of corrected errors (CEs) in a memory, and when a quantity of CEs reaches a threshold, a basic input/output system (BIOS) delivers a command to trigger a bottom-layer memory isolation and replacement action of a central processing unit (CPU), to isolate a faulty region, and a memory in the faulty region is no longer used, so as to avoid reading and writing the faulty region again. The repair method cannot accurately determine a severity of the memory fault and an accurate location of the memory fault. As a result, fault isolation accuracy and coverage are poor, and a system breakdown probability is high.

SUMMARY

Embodiments of this application provide a memory fault handling method and apparatus, to reduce a probability of system breakdown caused by a memory fault.

To achieve the foregoing objectives, the following technical solutions are used in embodiments of this application.

According to a first aspect of the embodiment of this application, a memory fault handling method is provided. The method includes: A management module obtains error information of a memory. The management module determines, based on the error information of the memory by using a machine learning algorithm, a fault feature mode of the memory or an isolation repair technology used to repair the memory. The management module determines, based on the fault feature mode of the memory or the isolation repair technology used to repair the memory, to repair the memory by using at least one of hardware isolation or software isolation. Based on this solution, the fault feature mode of the memory or the isolation repair technology used to repair the memory determined based on the error information of the memory by using the machine learning algorithm is accurate. In addition, the management module may determine a specific isolation manner to be used for different fault feature modes or different isolation repair technologies. Therefore, accuracy of fault repair is high, and a probability of system breakdown is reduced.

For example, that the management module determines, based on the error information of the memory by using a machine learning algorithm, a fault feature mode of the memory may include: The management module sequentially determines, with reference to current error information of the memory and historical error information of the memory, a condition of a fault mode that the current memory meets, and generates a fault mode code for the current memory. The fault mode code is used to indicate the condition of the fault mode that the current memory meets. The management module predicts, based on a plurality of fault mode codes by using the machine learning algorithm, a fault mode of the memory and a probability of a system-level fault caused by each fault mode, and determines the fault feature mode of the memory based on the probability.

With reference to the first aspect, in a possible implementation, the error information of the memory includes at least one of a state of a corrected error CE, occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, and a row address with a maximum quantity of memory patrol errors. The physical address information of the CE is used to indicate a physical location of the CE in the memory, and the physical address information of the uncorrected error is used to indicate a physical location of the uncorrected error in the memory. Based on this solution, a specific location of a memory fault can be accurately located based on detailed error information of the memory, thereby improving accuracy of locating the memory fault. It may be understood that the physical address information of the CE may indicate a specific physical location of the CE in the memory. For example, the physical address information of the CE may include one or more of information such as a CPU node number, a channel number, a DIMM slot number, a logical rank number, a bank group number, a bank number, a row number, a column number, a chip device number, or a bit location in which the CE is located. For another example, the physical address information of the uncorrected error may include one or more of information such as a CPU node number, a channel number, a DIMM slot number, a logical rank number, a bank group number, a bank number, a row number, a column number, a chip device number, or a bit location in which the uncorrected error is located.

With reference to the first aspect and the foregoing possible implementation, in another possible implementation, the fault feature mode includes at least one of a page page fault mode, a single-bit bit fault mode, a cell fault mode, a row row fault mode, a column column fault mode, a bank fault mode, a device device fault mode, a rank fault mode, a channel channel fault mode, a dual in-line memory module DIMM fault mode, a fault mode in which a small quantity of continuous errors occur, and a fault mode in which a large quantity of errors occur in a short period of time. Based on this solution, a fault feature mode of a located memory is accurate, and a specific isolation manner is determined for the fault feature mode. Therefore, accuracy of fault repair is high, and a probability of system breakdown is reduced.

With reference to the first aspect and the foregoing possible implementations, in another possible implementation, the method further includes: The management module obtains running status data of the memory. The running status data of the memory includes at least one of CPU usage information, temperature information, running program information, and memory health status information. Based on this solution, by obtaining data related to a running status of the memory, the fault mode of the memory or the isolation repair technology used to repair the memory can be predicted based on the data, to further improve accuracy of predicting the fault mode.

With reference to the first aspect and the foregoing possible implementations, in another possible implementation, that the management module determines, based on the error information of the memory by using a machine learning algorithm, a fault feature mode of the memory or an isolation repair technology used to repair the memory includes: The management module determines, based on the error information of the memory and the running status data of the memory by using the machine learning algorithm, the fault feature mode of the memory or the isolation repair technology used to repair the memory. Based on this solution, the fault feature mode of the memory or the isolation repair technology used to repair the memory is determined based on the error information of the memory and the running status data of the memory, so that accuracy of predicting the fault feature mode of the memory can be further improved.

With reference to the first aspect and the foregoing possible implementations, in another possible implementation, the method further includes: If the management module determines to repair the memory by using hardware isolation, the management module sends a first fault repair request to processor firmware. The first fault repair request is used to request the processor firmware to repair the memory, and the first fault repair request includes at least one of the fault feature mode of the memory or the isolation repair technology used to repair the memory. Based on this solution, when determining to repair the memory by using hardware isolation, the management module may notify the processor firmware of a fault feature mode of the current memory, or may notify the processor firmware of the isolation repair technology used to repair the memory, so that the processor firmware may repair a faulty region by using the isolation repair technology. Therefore, accuracy of fault repair is high, and a probability of system breakdown can be reduced. Optionally, the first fault repair request sent by the management module to the processor firmware may further include fault address information (for example, address information of a bank) of the memory, to indicate a region specifically repaired by the processor firmware.

With reference to the first aspect and the foregoing possible implementations, in another possible implementation, the method further includes: The management module receives a first fault repair response from the processor firmware. The first fault repair response carries a repair result obtained after the processor firmware repairs the memory. Based on this solution, after repairing the memory, the processor firmware feeds back the repair result to the management module, so that a success rate of fault repair can be further improved. In addition, the management module may predict a fault severity of the memory based on the repair result fed back by the processor firmware.

With reference to the first aspect and the foregoing possible implementations, in another possible implementation, the method further includes: The management module sends a first fault repair information table to the processor firmware. The first fault repair information table is used to indicate a fault feature mode and one or more hardware isolation repair technologies corresponding to the fault feature mode. Based on this solution, the processor firmware may learn, based on the first fault repair information table, the hardware isolation repair technology that may be used for the fault feature mode, to improve a repair capability of the processor firmware.

With reference to the first aspect and the foregoing possible implementations, in another possible implementation, the hardware isolation repair technology includes at least one of bit bit isolation and replacement, cell isolation and replacement, row row isolation and replacement, column column isolation and replacement, bank isolation and replacement, device device isolation and replacement, rank isolation and replacement, channel channel isolation and replacement, single device data correction SDDC, single device error correction SDEC, adaptive double device data correction-multiple region ADDDC-MR, adaptive data correction-single region ADC-SR, adaptive double device error correction ADDEC, partial cache line sparing PCLS, adaptive cache line sparing ACLS, hardware post-package repair hPPR, software post-package repair sPPR, post-package repair PPR, or a hardware isolation repair technology for replacing a specific address range of the memory. Based on this solution, the processor firmware may use different hardware isolation repair technologies for different fault feature modes, and repair accuracy is high.

With reference to the first aspect and the foregoing possible implementations, in another possible implementation, the processor firmware includes firmware, a basic input/output system BIOS, a management engine ME, or an intelligent management unit IMU. Based on this solution, the firmware, the BIOS, the ME, or the IMU can repair the faulty region of the memory, and the repair capability is strong.

With reference to the first aspect and the foregoing possible implementations, in another possible implementation, the method further includes: If the management module determines to repair the memory by using software isolation, the management module sends a second fault repair request to an operating system OS management unit. The second fault repair request is used to request the OS management unit to repair the memory, and the second fault repair request includes at least one of the fault feature mode of the memory or the isolation repair technology used to repair the memory. Based on this solution, when determining to repair the memory by using software isolation, the management module may notify the OS management unit of a fault feature mode of the current memory, or may notify the OS management unit of the isolation repair technology used to repair the memory, so that the OS management unit may repair a faulty region by using the isolation repair technology. Therefore, accuracy of fault repair is high, and a probability of system breakdown can be reduced. Optionally, the second fault repair request sent by the management module to the OS management unit may further include fault address information (for example, address information of a page) of the memory, to indicate a region specifically repaired by the OS management unit. It may be understood that the management module may directly notify the OS management unit of a software isolation repair technology used to repair the memory, or may notify only the OS management unit of the fault feature mode of the memory for the OS management unit determining a software isolation repair technology corresponding to the fault feature mode of the memory.

With reference to the first aspect and the foregoing possible implementations, in another possible implementation, the method further includes: The management module receives a second fault repair response from the OS management unit. The second fault repair response carries a repair result obtained after the OS management unit repairs the memory. Based on this solution, after repairing the memory, the OS management unit feeds back the repair result to the management module, so that the management module can predict a fault severity of the memory based on the repair result.

With reference to the first aspect and the foregoing possible implementations, in another possible implementation, the method further includes: The management module sends a second fault repair information table to the OS management unit. The second fault repair information table is used to indicate a fault feature mode and one or more software isolation repair technologies corresponding to the fault feature mode. Based on this solution, the OS management unit may learn, based on the second fault repair information table, the software isolation repair technology that may be used for the fault feature mode, to improve a repair capability of the OS management unit.

With reference to the first aspect and the foregoing possible implementations, in another possible implementation, the software isolation repair technology includes at least one of page offline, address isolation, process isolation, or a software isolation repair technology for replacing a specific address range of the memory. Based on this solution, the OS management unit may use different software isolation repair technologies for different fault feature modes, and repair accuracy is high.

With reference to the first aspect and the foregoing possible implementations, in another possible implementation, the OS management unit is a system management unit built in an OS or a device management agent program installed in an OS. Based on this solution, the system management unit or the device management agent program installed in the OS can repair the faulty region of the memory, and the repair capability is strong.

With reference to the first aspect and the foregoing possible implementations, in another possible implementation, that the management module determines, based on the error information of the memory and by using a machine learning algorithm, a fault feature mode of the memory includes: The management module determines the fault feature mode of the memory based on the error information of the memory and a fault prediction model by using the machine learning algorithm. The fault prediction model is used to predict the fault feature mode of the memory. Based on this solution, the fault feature mode of the memory may be determined based on the fault prediction model, to improve accuracy of the fault feature mode. Optionally, the management module may also determine the fault feature mode of the memory by using the machine learning algorithm based on the error information of the memory, the running status data of the memory, and the fault prediction model.

With reference to the first aspect and the foregoing possible implementations, in another possible implementation, the method further includes: The management module determines the fault severity of the memory. The management module sends alarm information to an upper-layer operation and maintenance system when the fault severity of the memory exceeds a preset threshold. Based on this solution, the management module can predict the fault severity of the memory, and send the alarm information when the fault of the memory is serious, to avoid a risk of system breakdown.

With reference to the first aspect and the foregoing possible implementations, in another possible implementation, that the management module determines the fault severity of the memory includes: The management module determines the fault severity of the memory based on at least one of the first fault repair response and the second fault repair response. Based on this solution, the management module may predict the fault severity of the memory based on repair results fed back by the processor firmware and the OS management unit, to avoid a risk of system breakdown.

With reference to the first aspect and the foregoing possible implementations, in another possible implementation, that the management module determines the fault severity of the memory includes: The management module determines the fault severity of the memory based on the error information of the memory and the running status data of the memory. Based on this solution, the management module may predict the fault severity of the memory based on the error information of the memory and the running status data of the memory, to avoid a risk of system breakdown.

With reference to the first aspect and the foregoing possible implementations, in another possible implementation, the management module is a management unit of a non-service module, and the management module includes a management unit for a running status, a management unit built in a processor, a management system in a management chip outside the processor, a server baseboard management controller BMC, a system management module SMM, or a device management system in the OS. Based on this solution, the management unit of the non-service module may communicate with the processor firmware and the OS management unit, so that the faulty region is located accurately, accuracy of fault repair is improved, and a probability of system breakdown is reduced.

According to a second aspect of the embodiment of this application, a memory fault handling method is provided. The method includes: A processor firmware sends error information of the memory to a management module. The processor firmware receives a first fault repair request from the management module, where the first fault repair request is used to request the processor firmware to repair the memory, and the first fault repair request includes at least one of a fault feature mode of the memory or an isolation repair technology used to repair the memory. The processor firmware repairs the memory based on the isolation repair technology. Based on this solution, when determining to repair the memory by using hardware isolation, the management module may notify the processor firmware of a fault feature mode of the current memory, or may notify the processor firmware of the isolation repair technology used to repair the memory, so that the processor firmware may repair a faulty region by using the isolation repair technology. Therefore, accuracy of fault repair is high, and a probability of system breakdown can be reduced. It may be understood that the management module may directly notify the processor firmware of a hardware isolation repair technology used to repair the memory, or may notify only the processor firmware of the fault feature mode of the memory for the processor firmware determining the isolation repair technology used to repair the fault feature mode of the memory. Optionally, the first fault repair request received by the processor firmware may further include fault address information of the memory (for example, address information of a bank), and the processor firmware may determine a specific repair region based on the fault address information.

With reference to the second aspect, in a possible implementation, the error information of the memory includes at least one of a state of a corrected error CE, occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, and a row address with a maximum quantity of memory patrol errors. The physical address information of the CE is used to indicate a physical location of the CE in the memory, and the physical address information of the uncorrected error is used to indicate a physical location of the uncorrected error in the memory. Based on this solution, the processor firmware may send detailed error information of the memory to the management module, so that the management module can accurately locate a specific location of a memory fault based on the detailed error information of the memory, thereby improving accuracy of locating the memory fault.

With reference to the second aspect and the foregoing possible implementation, in another possible implementation, the foregoing fault feature mode includes at least one of a single-bit bit fault mode, a cell fault mode, a row row fault mode, a column column fault mode, a bank fault mode, a device device fault mode, a rank fault mode, a channel channel fault mode, a dual in-line memory module DIMM fault mode, a fault mode in which a small quantity of continuous errors occur, and a fault mode in which a large quantity of errors occur in a short period of time. Based on this solution, a fault feature mode of a located memory is accurate, and a specific isolation manner is determined for the fault feature mode. Therefore, accuracy of fault repair is high, and a probability of system breakdown is reduced.

With reference to the second aspect and the foregoing possible implementations, in another possible implementation, the method further includes: The processor firmware sends a first fault repair response to the management module. The first fault repair response carries a repair result obtained after the processor firmware repairs the memory. Based on this solution, after repairing the memory, the processor firmware feeds back the repair result to the management module, so that a success rate of fault repair can be further improved. In addition, the management module may predict a fault severity of the memory based on the repair result fed back by the processor firmware.

With reference to the second aspect and the foregoing possible implementations, in another possible implementation, the method further includes: The processor firmware receives a first fault repair information table from the management module. The first fault repair information table is used to indicate a fault feature mode and one or more hardware isolation repair technologies corresponding to the fault feature mode. Based on this solution, the processor firmware may learn, based on the first fault repair information table, the hardware isolation repair technology that may be used for the fault feature mode, to improve a repair capability of the processor firmware.

With reference to the second aspect and the foregoing possible implementations, in another possible implementation, the hardware isolation repair technology includes at least one of bit bit isolation and replacement, cell isolation and replacement, row row isolation and replacement, column column isolation and replacement, bank isolation and replacement, device device isolation and replacement, rank isolation and replacement, channel channel isolation and replacement, single device data correction SDDC, single device error correction SDEC, adaptive double device data correction-multiple region ADDDC-MR, adaptive data correction-single region ADC-SR, adaptive double device error correction ADDEC, partial cache line sparing PCLS, adaptive cache line sparing ACLS, hardware post-package repair hPPR, software post-package repair sPPR, post-package repair PPR, or a hardware isolation repair technology for replacing a specific address range of the memory. Based on this solution, the processor firmware may use different hardware isolation repair technologies for different fault feature modes, and repair accuracy is high.

With reference to the second aspect and the foregoing possible implementations, in another possible implementation, the method further includes: The processor firmware determines, based on the fault feature mode of the memory and the first fault repair information table, the isolation repair technology used to repair the memory. Based on this solution, the processor firmware may learn, based on the first fault repair information table, the hardware isolation repair technology that may be used for the fault feature mode, to improve a repair capability of the processor firmware.

With reference to the second aspect and the foregoing possible implementations, in another possible implementation, the processor firmware includes firmware, a basic input/output system BIOS, a management engine ME, or an intelligent management unit IMU. Based on this solution, the firmware, the BIOS, the ME, or the IMU can repair the faulty region of the memory, and the repair capability is strong.

According to a third aspect of the embodiment of this application, a memory fault handling method is provided. The method includes: An operating system OS management unit receives a second fault repair request from a management module, where the second fault repair request is used to request the OS management unit to repair the memory, and the second fault repair request includes at least one of a fault feature mode of the memory or an isolation repair technology used to repair the memory. The OS management unit repairs the memory based on the isolation repair technology. Based on this solution, the OS management unit receives the fault feature mode of the memory or the isolation repair technology used to repair the memory from the management module. The OS management unit may repair a faulty region by using the isolation repair technology. Therefore, accuracy of fault repair is high, and a probability of system breakdown can be reduced. It may be understood that the management module may directly notify the OS management unit of a software isolation repair technology used to repair the memory, or may notify only the OS management unit of the fault feature mode of the memory for the OS management unit determining a software isolation repair technology corresponding to the fault feature mode of the memory. Optionally, the second fault repair request sent by the management module to processor firmware may further include fault address information (for example, address information of a page) of the memory, to indicate a region specifically repaired by the processor firmware.

With reference to the third aspect, in a possible implementation, the fault feature mode includes at least one of a page page fault mode, a single-bit bit fault mode, a cell fault mode, a row row fault mode, a column column fault mode, a bank fault mode, a device device fault mode, a rank fault mode, a channel channel fault mode, a dual in-line memory module DIMM fault mode, a fault mode in which a small quantity of continuous errors occur, and a fault mode in which a large quantity of errors occur in a short period of time. Based on this solution, a fault feature mode of a located memory is accurate, and a specific isolation manner is determined for the fault feature mode. Therefore, accuracy of fault repair is high, and a probability of system breakdown is reduced.

With reference to the third aspect and the foregoing possible implementation, in another possible implementation, the method further includes: The OS management unit sends a second fault repair response to the management module. The second fault repair response carries a repair result obtained after the OS management unit repairs the memory. Based on this solution, after repairing the memory, the OS management unit feeds back the repair result to the management module, so that the management module can predict a fault severity of the memory based on the repair result.

With reference to the third aspect and the foregoing possible implementations, in another possible implementation, the method further includes: The OS management unit receives a second fault repair information table from the management module. The second fault repair information table is used to indicate a fault feature mode and one or more software isolation repair technologies corresponding to the fault feature mode. Based on this solution, the OS management unit may learn, based on the second fault repair information table, the software isolation repair technology that may be used for the fault feature mode, to improve a repair capability of the OS management unit.

With reference to the third aspect and the foregoing possible implementations, in another possible implementation, the software isolation repair technology includes at least one of page offline, address isolation, process isolation, or a software isolation repair technology for replacing a specific address range of the memory. Based on this solution, the OS management unit may use different software isolation repair technologies for different fault feature modes, and repair accuracy is high.

With reference to the third aspect and the foregoing possible implementations, in another possible implementation, the method further includes: The OS management unit determines, based on the fault feature mode of the memory and the second fault repair information table, the isolation repair technology used to repair the memory. Based on this solution, the OS management unit may learn, based on the second fault repair information table, the software isolation repair technology that may be used for the fault feature mode, to improve a repair capability of the OS management unit.

With reference to the third aspect and the foregoing possible implementations, in another possible implementation, the OS management unit is a system management unit built in an OS or a device management agent program installed in an OS. Based on this solution, the system management unit or the device management agent program installed in the OS can repair the faulty region of the memory, and the repair capability is strong.

According to a fourth aspect of the embodiment of this application, a management module is provided. The management module has a function of implementing the memory fault handling method according to any implementation of the first aspect. The function may be implemented by hardware, or may be implemented by hardware executing corresponding software. The hardware or the software includes one or more modules corresponding to the function.

According to a fifth aspect of the embodiment of this application, processor firmware is provided. The processor firmware has a function of implementing the memory fault handling method according to any implementation of the second aspect. The function may be implemented by hardware, or may be implemented by hardware executing corresponding software. The hardware or the software includes one or more modules corresponding to the function.

According to a sixth aspect of the embodiment of this application, an OS management unit is provided. The OS management unit has a function of implementing the memory fault handling method according to any implementation of the third aspect. The function may be implemented by hardware. The software includes one or more modules corresponding to the foregoing function.

According to a seventh aspect of the embodiment of this application, an embodiment of this application provides a computer-readable storage medium. The computer-readable storage medium stores instructions. When the instructions are run on a computer, the computer is enabled to perform the memory fault handling method according to any implementation of the first aspect to the third aspect.

According to an eighth aspect of the embodiment of this application, an embodiment of this application provides a computer program product including instructions. When the computer program product is run on a computer, the computer is enabled to perform the memory fault handling method according to any implementation of the first aspect to the third aspect.

According to a ninth aspect of the embodiment of this application, a memory fault handling system is provided. The memory fault handling system includes a management module, processor firmware, and an OS management unit. The management module is configured to implement the memory fault handling method according to any implementation of the first aspect. The processor firmware is configured to implement the memory fault handling method according to any implementation of the second aspect. The OS management unit is configured to implement the memory fault handling method according to any implementation of the third aspect.

DETAILED DESCRIPTION OF ILLUSTRATIVE EMBODIMENTS

Figure 1:
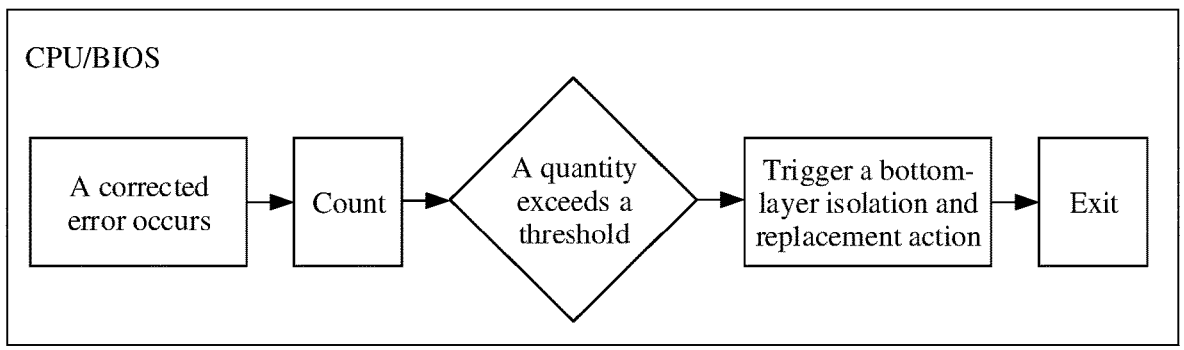
FIG. 1 is a schematic diagram of a method for repairing a fault of a memory according to an embodiment of this application.

The following describes the technical solutions in embodiments of this application with reference to the accompanying drawings in embodiments of this application. In this application, "at least one" means one or more, and "a plurality of" means two or more. The term "and/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence. For example, "first" in a first fault repair request and "second" in a second fault repair request in embodiments of this application are merely used to distinguish between different fault repair requests. Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

It should be noted that in this application, the term such as "an example" or "for example" is used to represent giving an example, an illustration, or descriptions. Any embodiment or design scheme described as an "example" or "for example" in this application should not be explained as being more preferred or having more advantages than another embodiment or design scheme. Exactly, use of the term such as "an example" or "for example" is intended to present a relative concept in a specific manner.

"A plurality of" in embodiments of this application refers to two or more.

Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

An architecture scenario described in embodiments of this application is intended to describe the technical solutions in embodiments of this application more clearly, and does not constitute a limitation on the technical solutions provided in embodiments of this application. A person of ordinary skill in the art may know that: With the evolution of the computer system, the technical solutions provided in embodiments of this application are also applicable to similar technical problems.

A memory of a current computing system has a hardware repair capability. For example, when the memory is faulty, redundant space may be used to replace faulty space, so as to isolate a faulty region of the memory on hardware. However, due to the limited redundant space in the memory, a hardware isolation technology is used for a limited quantity of times. For minor memory errors, an error correction algorithm may usually be used to correct the errors. When a severe fault occurs, the redundant space is used to repair the faulty region through replacement.

For example, FIG. 1 is a memory repair method. As shown in FIG. 1, after a corrected error (CE) of a memory is identified by using an error correction mechanism in a central processing unit (CPU), a basic input/output system (BIOS) counts the CE, and compares a quantity of CEs with a threshold. After the quantity of CEs reaches the threshold, the BIOS delivers a command to trigger an isolation and replacement action (for example, bank isolation and cell isolation) of a bottom-layer memory of the CPU, and isolates a faulty region, that is, a memory in the faulty region is no longer used, to avoid reading and writing the faulty region again.

However, due to a limited processing capability of the BIOS, only the counts of corrected errors of the memory can be accumulated, and a severity of a memory fault and accurate row and column locations of the memory fault cannot be accurately determined. Consequently, both precision and a coverage rate of fault isolation are poor. In addition, if the threshold is set to a large value, a large quantity of error scenarios may be missed. It is possible that an uncorrected error (uncorrected error, UCE) occurs before the quantity of CEs reaches the threshold, thereby causing system breakdown. If the threshold is set to a small value, a large quantity of minor faults may be isolated and replaced, and a real value of isolation and replacement cannot be played. Therefore, a location of a memory fault cannot be accurately determined by using the method, and accuracy of memory repair is low, resulting in a high probability of system breakdown.

Figure 2:
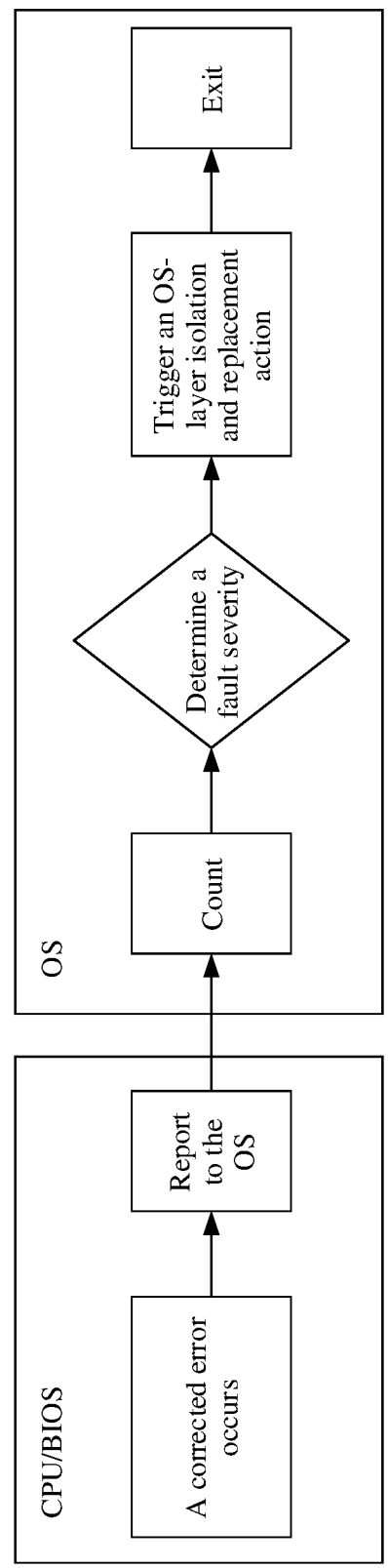
FIG. 2 is a schematic diagram of a method for repairing a fault of a memory according to an embodiment of this application.

For example, FIG. 2 shows another memory repair method. As shown in FIG. 2, after identifying a corrected error, a CPU reports the corrected error to an upper-layer operating system (OS), and the OS counts the corrected error and determines a fault severity. After a quantity of corrected errors reaches a threshold, the OS delivers a command to trigger an error isolation mechanism (for example, page page offline) in the OS, to isolate virtual space of a faulty region in the OS, and a memory address of the faulty region is no longer used.

However, in this method, the OS can only isolate and replace an OS layer, and cannot invoke a bottom-layer memory resource of the CPU. Therefore, a hardware isolation capability available at the bottom layer is wasted. In addition, after the OS layer is isolated, memory space is reduced. Especially for huge page offline, an isolation risk is high, and may easily cause system breakdown. Therefore, this method has a poor memory repair capability, causing a high probability of system breakdown.

To resolve a problem of system breakdown caused by inaccurate memory fault locating in the conventional technology, embodiments of this application provide a memory fault handling method. According to the method, a location of a memory fault can be accurately determined, so that accuracy of fault repair is high, and a probability of system breakdown is reduced.

Figure 3:
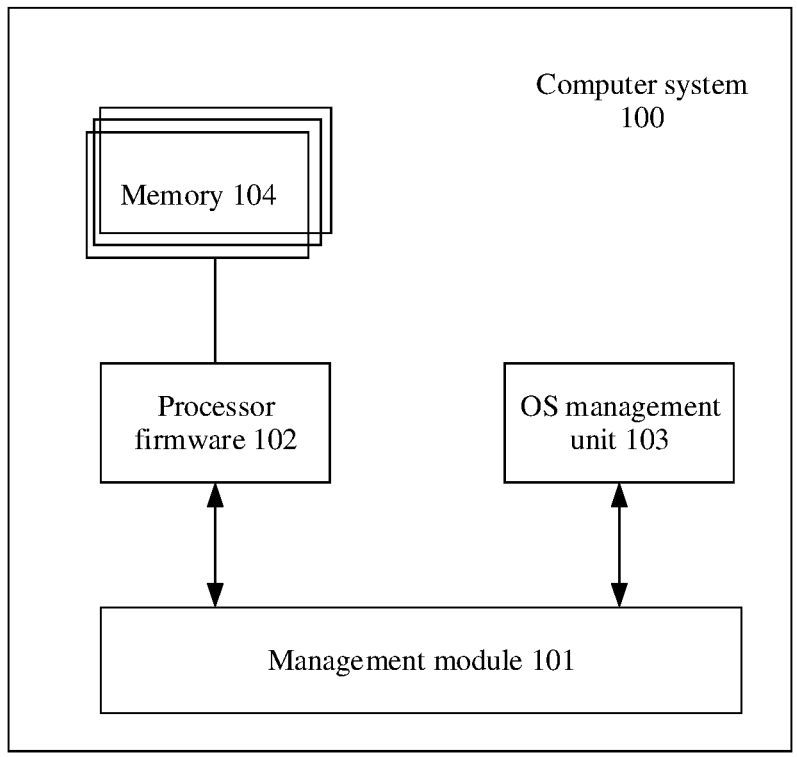
FIG. 3 is a schematic diagram of a structure of a computer system according to an embodiment of this application.

The memory fault handling method provided in embodiments of this application may be applied to a computer system 100 shown in FIG. 3. The computer system 100 may be a device such as a server, a storage controller, a switch, a router, a base station controller, a computing offload card, or a computing acceleration card. A specific form of the computer system shown in FIG. 3 is not limited in embodiments of this application. In the following embodiment, only an example in which the computer system is a server is used for description. As shown in FIG. 3, the computer system 100 includes a management module 101, processor firmware 102, an operating system OS management unit 103, and a memory 104.

The management module 101 may be a management unit of a non-service module, and the management module 101 may also be referred to as an out-of-band management module 101. For example, the management module 101 may remotely maintain and manage the server through a dedicated data channel. The management module 101 is entirely independent of an operating system OS of the server, and may communicate with a BIOS and the OS (or the OS management unit) through an out-of-band management interface of the server.

For example, the management module 101 may include a management unit such as a management unit for a server running status, a management unit built in a processor, a management system in a management chip outside the processor, a server baseboard management controller (BMC), a system management module (SMM), a management unit built in a service unit, or a device management system in the OS. A specific form of the management module is not limited in this embodiment of this application, and the description herein is merely an example. In the following embodiment, only an example in which the management module 101 is a BMC is used for description.

For example, the management module 101 may be configured to obtain error information of the memory 104 and data related to a running status of the memory 104. The management module 101 may further determine a fault feature mode of the memory by using a machine learning algorithm based on the error information of the memory 104 and the data related to the running status of the memory 104, and determine whether the fault mode is repaired by using a hardware isolation technology or a software isolation technology. When the management module 101 determines to repair the memory by using the hardware isolation technology, the management module 101 sends a repair request to the processor firmware 102. When the management module 101 determines to repair the memory by using the software isolation technology, the management module 101 sends a repair request to the OS management unit 103.

The processor firmware 102 may be firmware such as firmware, a basic input/output system BIOS, a management engine (ME), or an intelligent management unit (IMU). A specific form of the processor firmware 102 is not limited in this embodiment of this application, and the description herein is merely an example. In the following embodiment, only an example in which the processor firmware 102 is a BIOS is used for description.

The processor firmware 102 may be configured to detect error information when the memory is faulty, for example, related information of a corrected error and related information of an uncorrected error. It should be noted that specific content of the error information of the memory is merely an example, and specific content of the error information detected by the processor firmware 102 is not limited in this embodiment of this application.

For example, the OS management unit 103 may be a system management unit built in the OS, or may be a device management agent program installed in the OS. This is not limited in this embodiment of this application.

For example, the memory 104 may be a running memory of the computer system 100. There may be a plurality of memories 104 in the computer system 100, and the memory 104 may be a dynamic random access memory DRAM.

It should be noted that, in a specific implementation, the computer system 100 may be any device including a structure similar to that in FIG. 3. A specific type of the computer system 100 is not limited in this embodiment of this application. In addition, the composition structure shown in FIG. 3 does not constitute a limitation on the computer system 100. In addition to the components shown in FIG. 3, the computer system 100 may include more or fewer components than those shown in the figure, or may combine some components, or may have different component arrangements.

Figure 4:
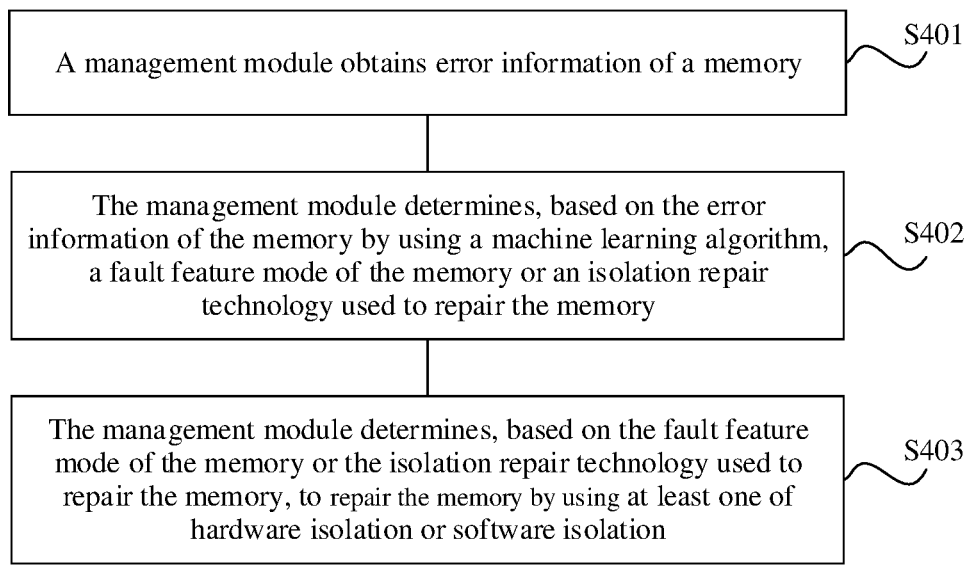
FIG. 4 is a schematic flowchart of a memory fault handling method according to an embodiment of this application.

With reference to FIG. 3, FIG. 4 shows a memory fault handling method according to an embodiment of this application. The method includes step S401 to step S403.

S401: The management module obtains the error information of the memory.

For example, the error information of the memory is error information in a running process of the memory. The error information of the memory may include information such as a state of a corrected error CE, occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, and a row address with a maximum quantity of memory patrol errors. Specific content included in the error information of the memory is not limited in this embodiment of this application, and the description herein is merely an example.

For example, the physical address information of the CE is used to indicate a physical location of the CE in the memory. In other words, a specific physical location of the CE in the memory may be determined based on the physical address information of the CE. For example, the physical address information of the CE may include one or more pieces of information such as a CPU node number, a channel number, a DIMM slot number, a logical rank number, a bank group number, a bank number, a row number, a column number, a chip device number, or a bit location in which the CE is located.

For example, the physical address information of the uncorrected error is used to indicate a physical location of the uncorrected error in the memory. To be specific, a specific physical location of the uncorrected error in the memory may be determined based on the physical address information of the uncorrected error. The physical address information of the uncorrected error may include one or more pieces of information such as a CPU node number, a channel channel number, a DIMM slot number, a logical rank number, a bank group number, a bank number, a row number, a column number, a chip device number, or a bit bit location in which the uncorrected error is located.

Specific content of the physical address information of the CE and specific content of the physical address information of the uncorrected error are not limited in this embodiment of this application, and the descriptions herein are merely an example.

Optionally, the uncorrected error has different names in different processors or computer systems. For example, in an x86 architecture, the uncorrected error may be referred to as software recoverable action required (SRAR), software recoverable action optional (SRAO), or uncorrected no action (UCNA). In an ARM architecture, the uncorrected error may be referred to as an uncorrected error (UE), an unrecoverable error (UEU), a signaled or recoverable error (UER), a latent or restartable error (UEO), or a deferred error (DE). A specific name of the uncorrected error is not limited in this application.

For example, that the management module obtains the error information of the memory in step S401 may include: The management module receives the error information of the memory from the processor firmware. For example, the BMC receives the error information of the memory sent by the BIOS. Optionally, the BMC may receive error information sent by other processor firmware (for example, firmware, the ME, or the IMU). This is not limited in this embodiment of this application.

Optionally, before step S401, the method may further include: The processor firmware detects the error information of the memory, and sends the error information detected by the processor firmware to the management module.

Optionally, before step S401, the method may further include: The management module receives running status data of the memory collected by a sensor. The running status data of the memory is data that can reflect a running status of the memory. For example, the running status data of the memory may include at least one of CPU usage information, temperature information, running program information, and memory health status information. Optionally, the running status data of the memory may alternatively include other data that can reflect the running status of the memory. This is not limited in this embodiment of this application. For example, the BMC may receive temperature information of each device (device) collected by a temperature sensor in the memory.

S402: The management module determines, based on the error information of the memory by using the machine learning algorithm, the fault feature mode of the memory or an isolation repair technology used to repair the memory.

For example, the fault feature mode of the memory may include one or more of the following fault modes: a page page fault mode, a single-bit bit fault mode, a cell fault mode, a row row fault mode, a column column fault mode, a bank fault mode, a device device fault mode, a rank fault mode, a channel channel fault mode, a dual in-line memory module DIMM fault mode, a fault mode in which a small quantity of continuous errors occur, and a fault mode in which a large quantity of errors occur in a short period of time. In this embodiment of this application, a specific granularity of the fault feature mode of the memory is not limited, and the description herein is merely an example.

With the development of technologies, there may be a fault feature mode with a finer granularity or a coarser granularity in the future.

For example, the isolation repair technology used to repair the memory determined by using the machine learning algorithm may be the hardware isolation repair technology or the software isolation repair technology. This is not limited in this embodiment of this application.

For example, the hardware isolation repair technology may include one or more of the following repair technologies: bit bit isolation and replacement, cell isolation and replacement, row row isolation and replacement, column column isolation and replacement, bank isolation and replacement, device device isolation and replacement, rank isolation and replacement, channel channel isolation and replacement, single device data correction (SDDC), single device error correction (SDEC), adaptive double device data correction-multiple region (ADDDC-MR), adaptive data correction-single region (ADC-SR), adaptive double device error correction (ADDEC), partial cache line sparing (PCLS), adaptive cache line sparing (ACLS), hardware post-package repair (hPPR), software post-package repair (sPPR), post-package repair (PPR), or a hardware isolation repair technology for replacing a specific address range of the memory. A specific type of the hardware isolation repair technology is not limited in this embodiment of this application, and the description herein is merely an example.

For example, the software isolation repair technology may include one or more of the following repair technologies: page offline (Page offline), address isolation, process isolation, or a software isolation repair technology for replacing a specific address range of the memory. A specific type of the software isolation repair technology is not limited in this embodiment of this application, and the description herein is merely an example.

For example, the machine learning algorithm in step S402 may include a threshold-based decision algorithm, a decision tree algorithm, a supervised machine learning algorithm, an unsupervised machine learning algorithm, a memory pin link detection algorithm, and the like. For example, the management module may determine, based on the decision tree algorithm, a random forest algorithm, or a neural network algorithm, the fault feature mode of the memory or the isolation repair technology used to repair the memory. In this embodiment of this application, a type of the machine learning algorithm specifically used for determining the fault feature mode of the memory or the isolation repair technology used to repair the memory is not limited, and the description herein is merely an example.

For example, that the management module determines the fault feature mode of the memory based on the error information of the memory by using the machine learning algorithm in step S402 may include: The management module determines the fault feature mode of the memory based on the error information of the memory and a fault prediction model by using the machine learning algorithm. The fault prediction model is used to predict the fault feature mode of the memory.

For example, the fault prediction model may be a fault prediction model established by an upper-layer operation and maintenance system by collecting statistics on error information of memories in a plurality of servers in a period of time and by using a machine learning algorithm based on the large amount of error information. Optionally, the machine learning algorithm used to establish the fault prediction model may be the same as the machine learning algorithm used to determine the fault feature mode of the memory.

Optionally, before step S402, the method may further include: The upper-layer operation and maintenance system sends the fault prediction model to the management module, and the management module receives the fault prediction model. In this way, the management module may determine the fault feature mode of the memory based on the fault prediction model. It may be understood that an input parameter of the fault prediction model may be the error information of the memory and the running status data of the memory, and an output parameter may be the fault feature mode.

For example, after the management module receives current error information of the memory in step S401, that the management module determines the fault feature mode of the memory based on the error information of the memory by using the machine learning algorithm in step S402 may include: The management module sequentially determines, with reference to the current error information of the memory and historical error information of the memory (where the historical error information is error information received by the management module before the management module receives the current error information), whether the current memory meets a condition of the single-bit bit fault mode, a condition of the cell fault mode, a condition of the row row fault mode, a condition of the column column fault mode, a condition of the bank fault mode, a condition of the device device fault mode, a condition of the rank fault mode, a condition of the DIMM fault mode, and a condition of the channel channel fault mode, and generates a fault mode code for the current memory. The fault mode code is used to indicate a condition of a fault mode that the current memory meets. The management module predicts, by using the machine learning algorithm based on a plurality of fault mode codes, a fault mode of the memory and a probability of causing a system-level fault by each fault mode, and determines the fault feature mode of the memory based on the probability of causing the system-level fault by each fault mode.

For example, the management module may sequentially determine, by using the machine learning algorithm, the condition of the fault mode that the current memory meets. Optionally, the current memory can meet conditions of one or more of the foregoing fault modes. For example, the current memory may meet the condition of the row fault mode, the condition of the bank fault mode, and the condition of the device fault mode. It may be understood that, in this embodiment of this application, a specific fault mode that the current memory meets and a condition of each fault mode are not limited, and the specific fault mode that the current memory meets is related to the running status of the memory. The description herein is merely an example.

Optionally, the condition of the single-bit fault mode, the condition of the cell fault mode, the condition of the row fault mode, the condition of the column fault mode, the condition of the bank fault mode, the condition of the device fault mode, the condition of the rank fault mode, the condition of the DIMM fault mode, and the condition of the channel fault mode may be obtained based on the fault prediction model. For example, based on the fault prediction model, it may be determined that the condition of the single-bit fault mode is that a quantity of errors of a same bit exceeds a threshold. For another example, based on the fault prediction model, it may be determined that the condition of the row fault mode is that a quantity of errors in a same row exceeds a threshold.

Optionally, when the management module generates the fault mode code for the current memory after determining that the current memory meets the conditions of the one or more fault modes, the fault mode code may be a code formed by a plurality of bits, where one bit may represent one fault mode, and different values of one bit may be used to indicate whether the current memory meets a condition of a fault mode corresponding to the bit.

For example, the fault mode code has nine bits, a value of one bit being 1 indicates that a condition of a fault mode corresponding to the bit is met, and a value of one bit being 0 indicates that a condition of a fault mode corresponding to the bit is not met. Bit 0 being 1 may be used to indicate that the current memory meets the condition of the single-bit fault mode. Bit 1 being 1 may be used to indicate that the current memory meets the condition of the cell fault mode. Bit 2 being 1 may be used to indicate that the current memory meets the condition of the row fault mode. Bit 3 being 1 may be used to indicate that the current memory meets the condition of the column fault mode. Bit 4 being 1 may be used to indicate that the current memory meets the condition of the bank fault mode. Bit 5 being 1 may be used to indicate that the current memory meets the condition of the device fault mode. Bit 6 being 1 may be used to indicate that the current memory meets the condition of the rank fault mode. Bit 7 being 1 may be used to indicate that the current memory meets the condition of the DIMM fault mode. Bit 8 being 1 may be used to indicate that the current memory meets the condition of the channel fault mode. For example, the fault mode code determined by the management module is 000110100, and the fault mode code is used to indicate that the current memory meets the condition of the row fault mode, the condition of the bank fault mode, and the condition of the device fault mode.

For example, each time the management module receives error information of a memory, the management module determines a fault mode code. The management module may predict, by using the machine learning algorithm and based on a plurality of historically determined fault mode codes and statistical values of the plurality of fault mode codes, probabilities of system-level faults caused by different fault modes in the memory, and determine a fault mode whose probability of causing a system-level fault is greater than a preset threshold as the fault feature mode of the memory. Optionally, the statistical value may include a result generated after statistical processing, such as an accumulated value, an average value, a sliding window average value, a standard deviation, and a probability distribution parameter.

Optionally, there may be one or more fault feature modes of the memory determined by the management module. This is not limited in this embodiment of this application. When the management module determines one fault feature mode of the memory, the management module sends the fault feature mode to the processor firmware. When the management module determines a plurality of fault feature modes of the memory, the management module may send a fault feature mode with a maximum fault probability to the processor firmware, or may send the plurality of fault feature modes to the processor firmware.

It may be understood that, for a specific implementation in which the management module determines, based on the error information of the memory by using the machine learning algorithm, the isolation repair technology used to repair the memory in step S402, refer to the foregoing implementation in which the management module determines, based on the error information of the memory by using the machine learning algorithm, the fault feature mode of the memory. Details are not described herein again.

Optionally, when before step S401, the method further includes: The management module receives the running status data of the memory collected by the sensor, step S402 may include: The management module determines, based on the error information of the memory and the running status data of the memory by using the machine learning algorithm, the fault feature mode of the memory or the isolation repair technology used to repair the memory. For example, the management module determines the fault mode code based on the error information of the memory; predicts, based on the fault mode code and the running status data of the memory by using the machine learning algorithm, a fault mode of the memory and a probability of causing a system-level fault by each fault mode; and determines the fault feature mode of the memory based on the probability of causing the system-level fault by each fault mode. It may be understood that, when the fault feature mode of the memory or the isolation repair technology used to repair the memory is determined based on the error information of the memory and the running status data of the memory, accuracy of a predicted fault mode or repair technology can be improved.

Optionally, when the management module determines that the fault feature mode of the memory is a DIMM fault mode or a fault mode with a coarser granularity than the DIMM fault mode (for example, the channel fault mode), the management module may send warning information to remind a user to replace a memory module, so as to repair the faulty memory.

It may be understood that, in this embodiment of this application, the error information of the memory is detailed, and may be specific to a row address and a column address. Therefore, a faulty region of the memory can be accurately located based on the error information. In addition, the fault feature mode that is of the memory and that is determined with reference to the detailed error information and by using the machine learning algorithm is accurate. Therefore, this solution can accurately locate a fault type and a fault location.

S403: The management module determines, based on the fault feature mode of the memory or the isolation repair technology used to repair the memory, to repair the memory by using at least one of hardware isolation or software isolation.

Hardware isolation is to isolate the faulty region by using a bottom-layer memory resource of the CPU. That is, redundant space at a bottom layer of the CPU can be used to replace the faulty region and isolate the faulty region.

Software isolation means that the OS layer isolates a region in which a memory error occurs. For example, for memory page offline (page offline), the OS layer may kill a process that is using a memory page, or the OS layer may close an application that is using the memory page. Optionally, the OS layer may isolate the memory page when an uncorrected error occurs on the memory page.

For example, based on different fault modes of the memory, the management module may determine to repair the faulty memory by using hardware isolation, or repair the faulty memory by using software isolation, or repair the faulty memory by using hardware isolation and software isolation.

Optionally, when the fault feature mode of the memory is the single-bit fault mode, the cell fault mode, the row fault mode, the column fault mode, the bank fault mode, the device fault mode, the rank fault mode, the channel fault mode, the dual in-line memory module DIMM fault mode, the fault mode in which a small quantity of continuous errors occur, or the fault mode in which a large quantity of errors occur in a short period of time, the management module may determine to repair the faulty memory by using hardware isolation. However, the redundant space of the bottom-layer memory of the CPU is limited. Therefore, the faulty memory may not be repaired by using hardware isolation. When the faulty memory cannot be repaired by using hardware isolation, the management module may determine to repair the faulty memory by using software isolation.

For example, when the fault feature mode of the memory is the cell fault mode (or the single-bit fault mode), the management module determines to repair the memory by using hardware isolation. If the redundant space of the bottom-layer memory of the CPU is insufficient, and the faulty memory cannot be repaired by using hardware isolation, the management module may determine to repair the faulty memory by using software isolation.

Optionally, when the fault mode of the memory is the page fault mode, the management module may determine to repair the memory by using software isolation.

In an implementation, that the management module determines, based on the fault feature mode of the memory, to repair the faulty memory by using hardware isolation and/or software isolation may include: The management module preferentially determines to repair the faulty memory by using hardware isolation, and when the faulty memory cannot be repaired by using hardware isolation, the management module determines to repair the faulty memory by using software isolation. It should be noted that, when the fault feature mode of the memory is a fault mode other than the page fault mode, the management module may determine, by using this implementation, to repair the faulty memory by using hardware isolation or software isolation. It should be noted that in this implementation, the management module may learn from feedback information of the processor firmware that the faulty memory cannot be repaired by using hardware isolation.

In another implementation, that the management module determines, based on the isolation repair technology used to repair the memory, to repair the memory by using hardware isolation and/or software isolation may include: When the isolation repair technology used to repair the memory is the hardware isolation repair technology, the management module determines to repair the memory by using hardware isolation. When the isolation repair technology used to repair the memory is the software isolation repair technology, the management module determines to repair the memory by using software isolation. When the isolation repair technology used to repair the memory includes both the hardware isolation repair technology and the software isolation repair technology, the management module determines to repair the memory by using hardware isolation and software isolation.

It may be understood that, in the memory fault handling method provided in this embodiment, the management module obtains the error information of the memory, determines the fault feature mode of the memory or the isolation repair technology by using a machine learning algorithm based on the error information of the memory, and then determines, based on the fault feature mode of the memory or the isolation repair technology, to repair the faulty memory by using hardware isolation and/or software isolation. In this scheme, the fault feature mode that is of the memory and that is determined by using the machine learning algorithm based on the detailed error information of the memory is accurate. In addition, the management module may determine specific isolation manners used for different fault feature modes or different isolation repair technologies. Therefore, accuracy of fault repair is high, and a probability of system breakdown can be reduced.

Figure 5:
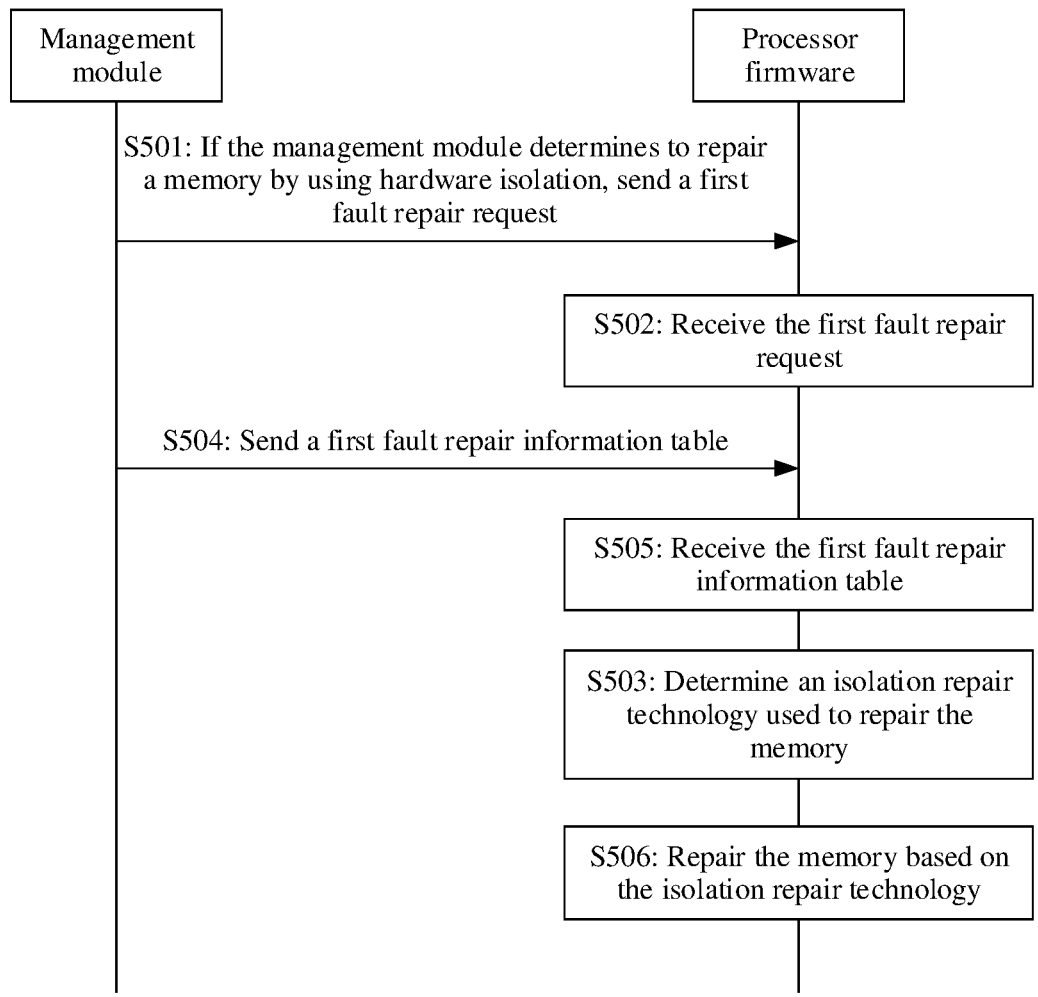
FIG. 5 is a schematic flowchart of another memory fault handling method according to an embodiment of this application.

An embodiment of this application further provides a memory fault handling method, which relates to interaction between a management module and processor firmware. As shown in FIG. 5, if it is determined to repair the memory by using hardware isolation in step S403, based on the foregoing step S401 to step S403, the method may further include step S501 to step S506. Step S401 to step S403 are not shown in FIG. 5.

S501: If the management module determines to repair the memory by using hardware isolation, the management module sends a first fault repair request to the processor firmware.

The first fault repair request is used to request the processor firmware to repair the memory, and the first fault repair request includes at least one of a fault feature mode of the memory or an isolation repair technology used to repair the memory. That is, the management module may directly send, to the processor firmware, a hardware isolation repair technology used to repair the memory, or may send the fault feature mode of the memory to the processor firmware, and the processor firmware determines, based on the fault feature mode of the memory, the hardware isolation repair technology used to repair the memory. Optionally, the management module may further send, to the processor firmware, the fault feature mode of the memory and the isolation repair technology used to repair the memory, so that the processor firmware may repair the faulty memory based on the isolation repair technology.

Optionally, the first fault repair request sent by the management module to the processor firmware may further include address information of a faulty region. For example, the fault feature mode of the memory is a cell fault mode. In addition to the cell fault mode, the first fault repair request sent by the management module to the processor firmware may further include specific address information of the faulty cell.

For example, the management module may send the first fault repair request to the processor firmware through an out-of-band management interface between the management module and the processor firmware. For example, if a BMC determines to repair the faulty memory by using a hardware isolation technology, the BMC may send a first fault repair request to a BIOS through a communication interface between the BMC and the BIOS, to request the BIOS to repair the faulty memory.

S502: The processor firmware receives the first fault repair request from the management module.

For example, the BIOS may receive a first fault repair request from the BMC. The BIOS learns, based on the fault feature mode of the memory and/or the isolation repair technology used to repair the memory included in the first fault repair request, a fault type of the current memory and/or the isolation repair technology used to repair the memory. Optionally, the BIOS may learn a location of the faulty region based on address information of a faulty region that is further included in the first fault repair request.

For example, when the first fault repair request includes the isolation repair technology used to repair the memory, step S506 continues to be performed after step S501 and step S502. That is, the processor firmware may repair the memory based on the isolation repair technology sent by the management module.

For example, when the first fault repair request does not include the isolation repair technology used to repair the memory (for example, the first fault repair request includes only the fault feature mode of the memory), step S503 to step S506 continue to be performed after step S501 and step S502. That is, the processor firmware may determine, based on the fault feature mode of the memory sent by the management module, the isolation repair technology used to repair the memory, and then repair the memory based on the isolation repair technology.

(Optional) S503: The processor firmware determines the isolation repair technology used to repair the memory.

In an implementation, that the processor firmware determines the isolation repair technology used to repair the memory may include: The processor firmware determines, based on the fault feature mode of the memory, which hardware isolation repair technology is used to repair the faulty memory. For example, when the fault feature mode of the memory is a bank fault mode, the processor firmware may determine to repair the faulty memory by using bank isolation and replacement. For another example, when the fault feature mode of the memory is a cell fault mode, the processor firmware may determine to repair the faulty memory by using cell isolation and replacement. That is, in this implementation, the processor firmware determines, based on the fault feature mode of the memory, which isolation repair technology is specifically used.

In another implementation, the processor firmware may further determine, based on a first fault repair information table sent by the management module, an isolation repair technology used to repair the memory. The first fault repair information table is used to indicate a fault feature mode and one or more hardware isolation repair technologies corresponding to the fault feature mode. That is, the management module may learn, by querying the first fault information table, the hardware isolation repair technology that may be used for the fault feature mode.

For example, the fault feature mode in the first fault repair information table may include one or more of a single-bit fault mode, a cell fault mode, a row fault mode, a column fault mode, a bank fault mode, a device fault mode, a rank fault mode, a channel fault mode, a dual in-line memory module DIMM fault mode, a fault mode in which a small quantity of continuous errors occur, and a fault mode in which a large quantity of errors occur in a short period of time.

For example, a same hardware isolation repair technology may be used for different fault feature modes in the first fault repair information table. Different hardware isolation repair technologies may be used for different fault feature modes. In the embodiment of this application, a type of a hardware isolation repair technology specifically used for each fault feature mode is not limited.

For example, one hardware isolation repair technology or a plurality of hardware isolation repair technologies may be used for one fault feature mode in the first fault repair information table.

Optionally, if the processor firmware queries the first fault repair information table and determines that the fault feature mode of the memory corresponds to a plurality of hardware isolation repair technologies, the processor firmware may determine a hardware isolation repair technology from the plurality of hardware isolation repair technologies.

Optionally, if the processor firmware determines, based on the first fault repair information table sent by the management module, an isolation repair technology corresponding to the fault feature mode of the memory, step S504 and step S505 may be further included before step S503.

(Optional) S504: The management module sends the first fault repair information table to the processor firmware.

Optionally, the first fault repair information table may be carried in the first fault repair request.

(Optional) S505. The processor firmware receives the first fault repair information table.

It may be understood that an execution sequence between step S504 and step S505 and other steps is not limited in this embodiment of this application. FIG. 5 is merely an example. For example, step S504 and step S505 may also be performed before step S501.

S506: The processor firmware repairs the memory based on the isolation repair technology.

For example, the processor firmware may repair the memory based on the isolation repair technology sent by the management module, or may repair the memory based on the isolation repair technology determined by the processor firmware in step S503.

For example, the isolation repair technology bank isolation and replacement sent by the management module is used as an example. The BIOS may use the bank isolation and replacement technology to isolate a faulty bank by using a bottom-layer resource. For another example, the fault feature mode is a cell fault mode, and the isolation repair technology corresponding to the cell fault mode in the first fault repair information table is cell isolation and replacement. The BIOS may use the cell isolation and replacement technology to isolate a faulty cell by using a bottom-layer resource.

It may be understood that, according to the memory fault handling method provided in this embodiment of this application, the fault feature mode of the memory or the isolation repair technology used to repair the memory that is determined by using the machine learning algorithm based on the detailed error information of the memory is accurate. In addition, when determining to repair the memory by using hardware isolation, the management module notifies the processor firmware, so that the processor firmware may repair the faulty region by using a corresponding isolation and replacement technology and using a bottom-layer resource. Therefore, accuracy of fault repair is high, and a probability of system breakdown can be reduced.

Figure 6:
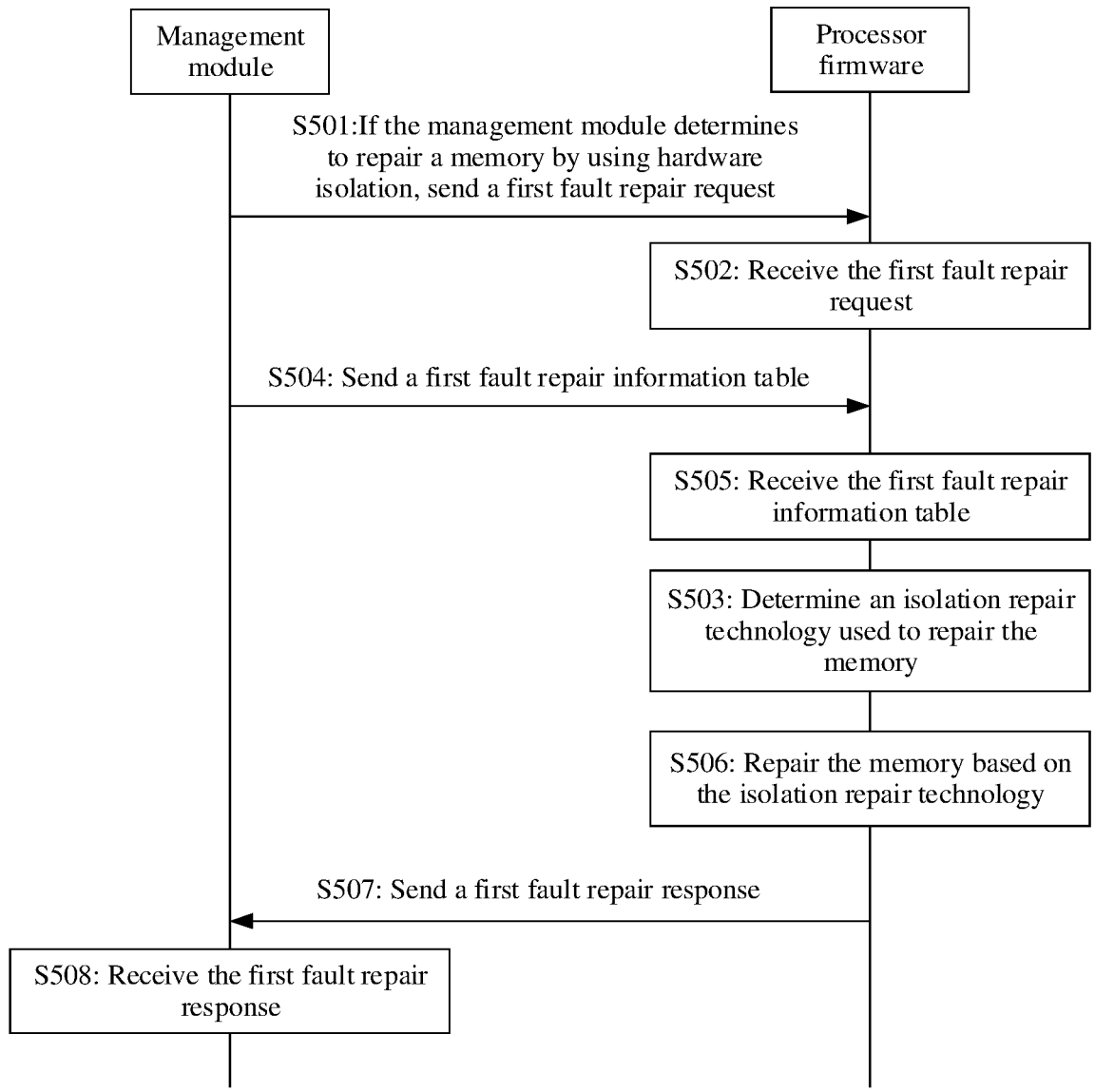
FIG. 6 is a schematic flowchart of another memory fault handling method according to an embodiment of this application.

Optionally, an embodiment of this application further provides a memory fault handling method. As shown in FIG. 6, after step S501 to step S506, step S507 and step S508 may be further included. Step S401 to step S403 are not shown in FIG. 6.

S507: The processor firmware sends a first fault repair response to the management module.

The first fault repair response carries a repair result obtained after the processor firmware repairs the memory. For example, the first fault repair response carries that the processor firmware successfully repairs the memory, or the first fault repair response carries that the processor firmware fails to repair the memory.

For example, when the processor firmware successfully repairs the memory by using the isolation repair technology corresponding to the fault feature mode of the memory, the repair result sent by the processor firmware to the management module is that the repair succeeds. When the processor firmware fails to repair the memory by using the isolation repair technology corresponding to the fault feature mode of the memory, the repair result sent by the processor firmware to the management module is that the repair fails.

It may be understood that, because the bottom-layer resource of the processor is limited, when the bottom-layer resource is insufficient, the processor firmware may not be able to repair the memory. Therefore, the processor firmware fails to repair the memory.

S508: The management module receives the first fault repair response.

For example, the management module may learn, based on the repair result carried in the first fault repair response, that the processor firmware successfully repairs or fails to repair the memory. When the repair result carried in the first fault repair response is that the repair fails, the management module may determine that the bottom-layer resource of the CPU is insufficient, and the management module may send a repair request to an OS management unit, to request the OS management unit to repair the faulty memory by using a software isolation technology.

For example, if redundant space of the bottom-layer memory of the CPU is less than one cell, but the fault feature mode of the current memory is the cell fault mode, the processor firmware cannot successfully repair the memory by using the cell isolation repair technology, and the processor firmware sends, to the management module, a current repair result that the repair fails. After receiving the repair result sent by the processor firmware, the management module may send a fault request to the OS management unit, to request the OS management unit to perform repair by using the software isolation technology.

Optionally, the management module may further determine a fault severity of the memory based on the repair result carried in the first fault repair response, and warn when the fault severity of the memory is high.

It may be understood that, according to the memory fault handling method provided in this embodiment of this application, it is accurate to determine, by using a machine learning algorithm based on detailed error information of the memory, a fault feature mode of the memory or an isolation repair technology used to repair the memory. In addition, when determining to repair the memory by using hardware isolation, the management module notifies the processor firmware, so that the processor firmware may repair the faulty region by using a corresponding isolation and replacement technology and using a bottom-layer resource. Therefore, accuracy of fault repair is high, and a probability of system breakdown can be reduced. In addition, after the processor firmware repairs the memory, the processor firmware feeds back a repair result to the management module, so that a success rate of fault repair can be further improved.

Figure 7:
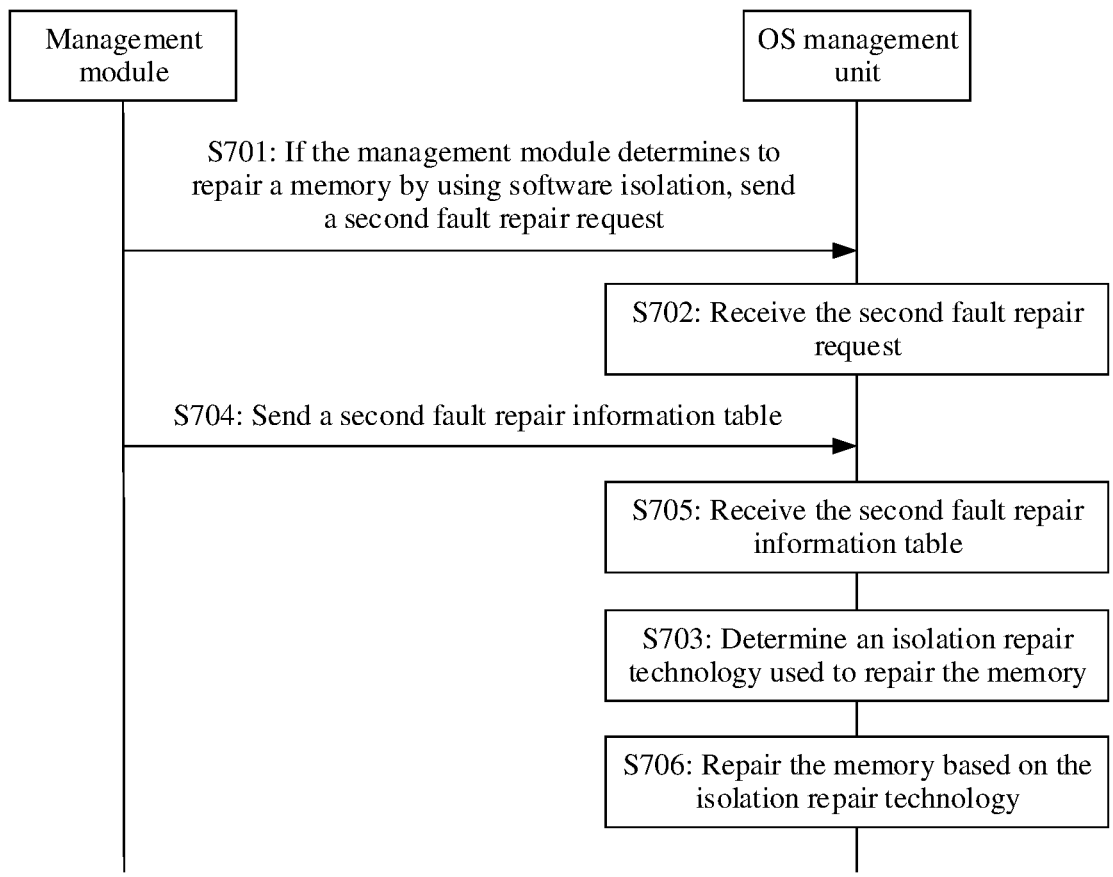
FIG. 7 is a schematic flowchart of another memory fault handling method according to an embodiment of this application.

An embodiment of this application further provides a memory fault handling method, which relates to interaction between a management module and an OS management unit. As shown in FIG. 7, if it is determined to repair memory by using software isolation in step S403, based on the foregoing step S401 to step S403, the method may further include step S701 to step S706. Step S401 to step S403 are not shown in FIG. 7.

S701: If the management module determines to repair the memory by using software isolation, the management module sends a second fault repair request to the OS management unit.

The second fault repair request is used to request the OS management unit to repair the memory, and the second fault repair request includes at least one of a fault feature mode of the memory or an isolation repair technology used to repair the memory. That is, the management module may directly send, to the OS management unit, a software isolation repair technology used to repair the memory, or may send the fault feature mode of the memory to the OS management unit, and the OS management unit determines, based on the fault feature mode of the memory, the software isolation repair technology used to repair the memory. Optionally, the management module may further send, to the OS management unit, the fault feature mode of the memory and the isolation repair technology used to repair the memory, so that the OS management unit may repair the faulty memory based on the isolation repair technology.

Optionally, the second fault repair request sent by the management module to the OS management unit may further include address information of a faulty region. For example, the fault feature mode of the memory is a page fault mode. In addition to the page fault mode, the second fault repair request may further include specific information about a faulty page.

For example, the management module may send the second fault repair request to the OS management unit through an out-of-band management interface between the management module and the OS management unit. For example, if a BMC determines to repair the faulty memory by using the software isolation repair technology, the BMC may send a second fault repair request to the OS management unit through a communication interface between the BMC and the OS management unit, to request the OS management unit to repair the faulty memory.

S702: The OS management unit receives the second fault repair request from the management module.

For example, the OS management unit may receive the second fault request from the BMC, and the OS management unit learns a fault type of the current memory based on the fault feature mode included in the second fault repair request. For another example, the OS management unit learns, based on the isolation repair technology used to repair the memory included in the second fault repair request, which repair technology is used to repair the memory. Optionally, the OS management unit may further learn a specific location of the faulty region based on the address information of the faulty region included in the second fault repair request.

For example, when the second fault repair request includes the isolation repair technology used to repair the memory, step S706 continues to be performed after step S701 and step S702. That is, the OS management unit may repair the memory based on the isolation repair technology sent by the management module.

For example, when the second fault repair request does not include the isolation repair technology used to repair the memory (for example, the second fault repair request includes only the fault feature mode of the memory), step S703 to step S706 continue to be performed after step S701 and step S702. That is, the OS management unit may determine, based on the fault feature mode of the memory sent by the management module, the isolation repair technology used to repair the memory, and then repair the memory based on the isolation repair technology.

(Optional) S703: The OS management unit determines the isolation repair technology used to repair the memory.

In an implementation, that the OS management unit determines the isolation repair technology used to repair the memory may include: The OS management unit determines, based on the fault feature mode of the memory, which software isolation repair technology is used to repair the faulty memory. That is, in this implementation, the OS management unit determines, based on the fault feature mode of the memory, which isolation repair technology is specifically used. For example, when the fault feature mode of the memory is a page fault mode, the OS management unit may determine to repair the faulty memory by using page offline (Page offline).

In another implementation, the OS management unit may further determine, based on a second fault repair information table sent by the management module, the isolation repair technology used to repair the memory. The second fault repair information table is used to indicate a fault feature mode and one or more software isolation repair technologies corresponding to the fault feature mode. That is, the OS management unit may learn, by querying the second fault information table, the software isolation repair technology that may be used for the fault feature mode.

For example, the fault feature mode in the second fault repair information table may include one or more of a page page fault mode, a single-bit fault mode, a cell fault mode, a row fault mode, a column fault mode, a bank fault mode, a device fault mode, a rank fault mode, a channel fault mode, a dual in-line memory module DIMM fault mode, a fault mode in which a small quantity of continuous errors occur, and a fault mode in which a large quantity of errors occur in a short period of time.

For example, a same software isolation repair technology may be used for different fault feature modes in the second fault repair information table. Different software isolation repair technologies may be used for different fault feature modes. In the embodiment of this application, a type of a software isolation repair technology specifically used for each fault feature mode is not limited.

For example, one software isolation repair technology or a plurality of software isolation repair technologies may be used for one fault feature mode in the second fault repair information table.

Optionally, if the OS management unit queries the second fault repair information table and determines that the fault feature mode of the memory corresponds to a plurality of software isolation repair technologies, the OS management unit may determine a software isolation repair technology from the plurality of software isolation repair technologies.

Optionally, if the OS management unit determines, based on the second fault repair information table sent by the management module, an isolation repair technology corresponding to the fault feature mode of the memory, step S704 and step S705 may be further included before step S703.

(Optional) S704: The management module sends the second fault repair information table to the OS management unit.

Optionally, the second fault repair information table may be carried in the second fault repair request.

(Optional) S705: The OS management unit receives the second fault repair information table.

It may be understood that an execution sequence between step S704 and step S705 and other steps is not limited in this embodiment of this application. FIG. 7 is merely an example. For example, step S704 and step S705 may also be performed before step S701.

S706: The OS management unit repairs the memory based on the isolation repair technology.

For example, the OS management unit may repair the memory based on the isolation repair technology sent by the management module, or may repair the memory based on the isolation repair technology determined by the OS management unit in step S703.

For example, the isolation repair technology sent by the management module is page offline replacement. The OS management unit may isolate the faulty page by using the page offline replacement technology.

It may be understood that, according to the memory fault handling method provided in this embodiment of this application, it is accurate to determine, by using a machine learning algorithm based on detailed error information of the memory, a fault feature mode of the memory or an isolation repair technology used to repair the memory. In addition, when determining to repair the memory by using software isolation, the management module notifies the OS management unit, so that the OS management unit may repair the faulty region by using a corresponding software isolation and replacement technology. Therefore, accuracy of fault repair is high, and a probability of system breakdown can be reduced.

Figure 8:
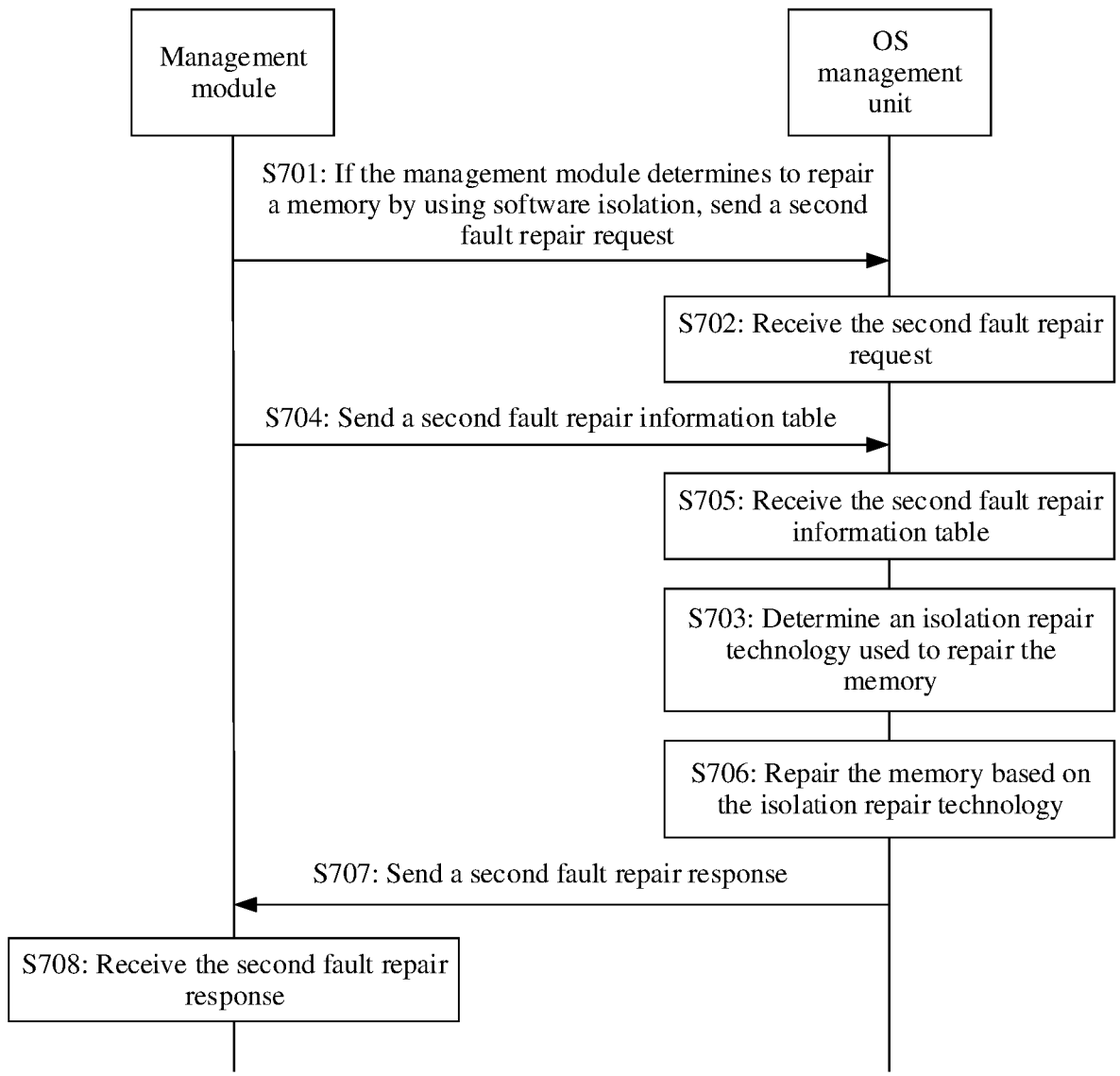
FIG. 8 is a schematic flowchart of another memory fault handling method according to an embodiment of this application.

Optionally, an embodiment of this application further provides a memory fault handling method. As shown in FIG. 8, after step S701 to step S706, step S707 and step S708 may be further included. Step S401 to step S403 are not shown in FIG. 8.

S707: The OS management unit sends a second fault repair response to the management module.

The second fault repair response carries a repair result obtained after the OS management unit repairs the memory. For example, the second fault repair response carries that the OS management unit successfully repairs the memory, or the second fault repair response carries that the OS management unit fails to repair the memory.

For example, when the OS management unit successfully repairs the memory by using the isolation repair technology corresponding to the fault feature mode of the memory, the repair result sent by the OS management unit to the management module is that the repair succeeds. When the OS management unit fails to repair the memory by using the isolation repair technology corresponding to the fault feature mode of the memory, the repair result sent by the OS management unit to the management module is that the repair fails.

S708: The management module receives the second fault repair response.

For example, the management module may learn, based on the repair result carried in the second fault repair response, that the OS management unit successfully repairs or fails to repair the memory.

Optionally, the management module may determine the fault severity of the memory based on the repair result in the second fault repair response. For example, when the repair result carried in the second fault repair response is that the repair fails, the management module may further determine the fault severity of the memory based on the repair result, and warn when the fault severity of the memory is high.

It may be understood that, according to the memory fault handling method provided in this embodiment of this application, it is accurate to determine, by using a machine learning algorithm based on detailed error information of the memory, a fault feature mode of the memory or an isolation repair technology used to repair the memory. In addition, when determining to repair the memory by using software isolation, the management module notifies the OS management unit, so that the OS management unit may repair the faulty region by using a corresponding software isolation and replacement technology. Therefore, accuracy of fault repair is high, and a probability of system breakdown can be reduced.

Figure 9:
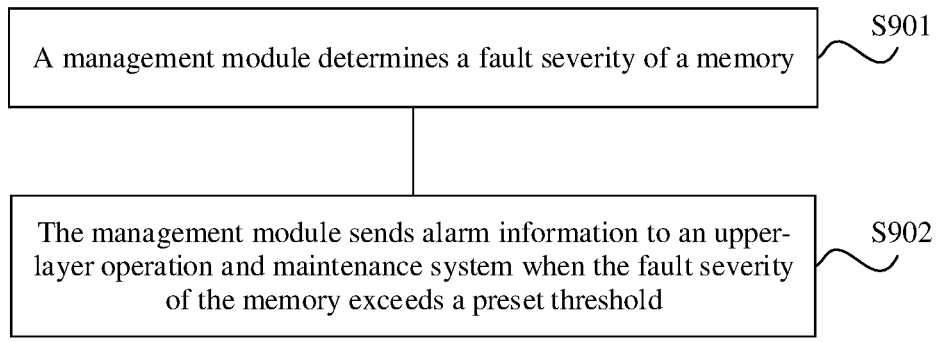
FIG. 9 is a schematic flowchart of another memory fault handling method according to an embodiment of this application.

For example, an embodiment of this application further provides a memory fault handling method. As shown in FIG. 9, after step S501 to step S508 and/or step S701 to step S708, step S901 and step S902 may be further included. Step S501 to step S508 and step S701 to step S708 are not shown in FIG. 9.

S901: A management module determines a fault severity of the memory.

In an implementation, that the management module determines the fault severity of the memory may include: The management module determines the fault severity of the memory based on error information of the memory and running status data of the memory.

In another implementation, that the management module determines the fault severity of the memory may include: The management module determines the fault severity of the memory based on at least one of a first fault repair response and a second fault repair response. That is, the management module may determine the fault severity of the memory based on a repair result fed back by a processor firmware and a repair result fed back by an OS management unit.

Optionally, the management module may further determine the fault severity of the memory with reference to at least one of the error information of the memory, the running status data of the memory, the first fault repair response, and the second fault repair response.

S902: The management module sends alarm information to an upper-layer operation and maintenance system when the fault severity of the memory exceeds a preset threshold.

The alarm information may carry a risk assessment result (for example, a risk level) and pre-alarm information.

Optionally, the alarm information may be further displayed on the management module to prompt a user to replace a memory module in time, thereby avoiding a risk of system breakdown.

Optionally, the management module may further perform fault prediction based on the error information of the memory, the running status data of the memory, the first fault repair response, and the second fault repair response, and evaluate a failure risk status of the memory.

It may be understood that, according to the memory fault handling method provided in this embodiment of this application, it is accurate to determine, by using a machine learning algorithm based on detailed error information of the memory, a fault feature mode of the memory. In addition, when determining to repair the memory by using software isolation, the management module notifies the OS management unit, so that the OS management unit may repair a faulty region by using a corresponding software isolation and replacement technology. Therefore, accuracy of fault repair is high, and a probability of system breakdown can be reduced. In addition, by evaluating the fault severity of the memory, when the fault severity of the memory is high, the pre-alarm information of the memory may be released to prompt the user, so as to avoid a risk of system breakdown.

The foregoing mainly describes, from a perspective of the steps of the methods, the solutions provided in embodiments of the present disclosure. It may be understood that, to implement the foregoing functions, a computer includes corresponding hardware structures and/or software modules for performing the functions. A person skilled in the art should be easily aware that, in combination with units and algorithm steps of the examples described in embodiments disclosed in this specification, this application can be implemented by a combination of hardware and computer software. A person skilled in the art may use different methods to implement the described functions for each particular application, but it should not be considered that the implementation goes beyond the scope of the present disclosure.

In embodiments of this application, the computer may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of the present disclosure, division into modules is an example and is merely logical function division. During actual implementation, there may be another division manner.

Figure 10:
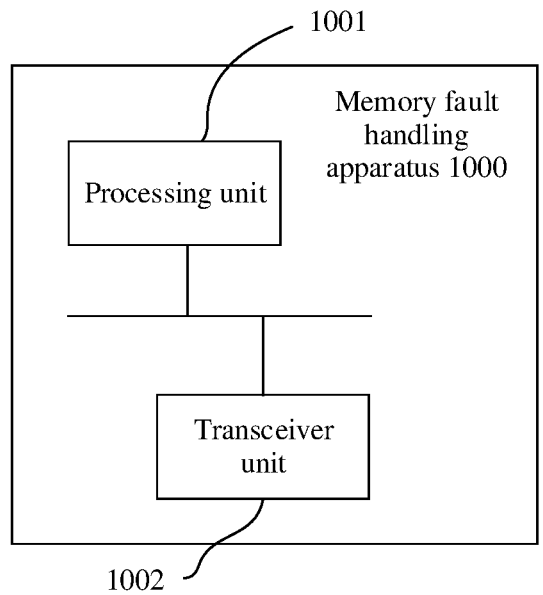
FIG. 10 is a schematic composition diagram of a memory fault handling apparatus according to an embodiment of this application.

FIG. 10 is a schematic diagram of a structure of a memory fault handling apparatus 1000. The memory fault handling apparatus may be the management module in the foregoing embodiments, or may be a chip in the foregoing management module. The memory fault handling apparatus 1000 may be configured to implement a method and a function of the management module in any one of the foregoing embodiments.

The memory fault handling apparatus 1000 includes a processing unit 1001 and a transceiver unit 1002. For example, the transceiver unit 1002 may be configured to support the management module in communicating with the processor firmware, the OS management unit, and the upper-layer operation and maintenance system in the foregoing embodiment. The processing unit 1001 is configured to control and manage an action of the management module, and is configured to perform processing performed by the management module in the foregoing embodiment. Optionally, if the memory fault handling apparatus 1000 includes a storage unit, the processing unit 1001 may further execute programs or instructions stored in the storage unit, so that the memory fault handling apparatus 1000 implements the method and functions in any one of the foregoing embodiments.

For example, the processing unit 1001 may be configured to perform step S401 to step S403 in FIG. 4, or step S901 and step S902 in FIG. 9, and/or another process used for the technology described in this specification. The transceiver unit 1002 may be configured to perform, for example, step S501 and step S504 in FIG. 5, or step S508 in FIG. 6, or step S701 and step S704 in FIG. 7, or step S708 in FIG. 8, and/or another process used for the technology described in this specification (for example, the transceiver unit 1002 may be further configured to receive running status data of a memory detected by a sensor). All related content of the steps in the foregoing method embodiments may be cited in function descriptions of the corresponding functional modules. Details are not described herein again.

For example, in hardware implementation, one processor may perform a function of the processing unit 1001, and a transceiver (a transmitter/a receiver) and/or a communication interface may perform a function of the transceiver unit 1002. The processing unit 1001 may be built in or independent of a processor of the memory fault handling apparatus 1000 in a hardware form, or may be stored in the storage of the memory fault handling apparatus 1000 in a software form, so that the processor invokes and performs an operation corresponding to each functional unit.

Figure 11:
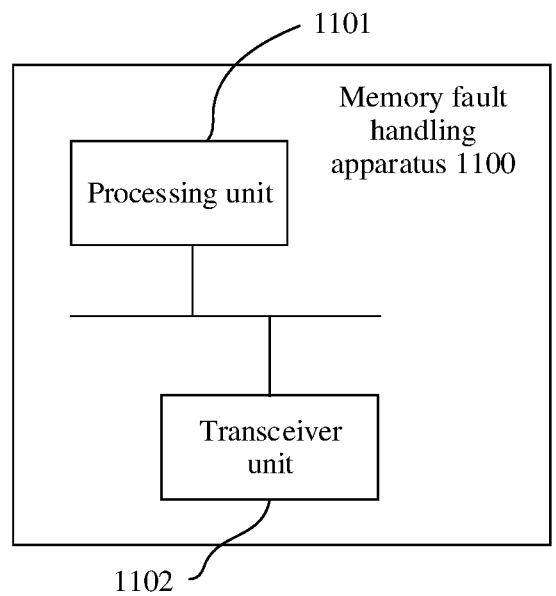
FIG. 11 is a schematic composition diagram of another memory fault handling apparatus according to an embodiment of this application.

FIG. 11 is a schematic diagram of a structure of a memory fault handling apparatus 1100. The memory fault handling apparatus may be the foregoing processor firmware, or may be a chip in the foregoing processor firmware. The memory fault handling apparatus 1100 may be configured to implement a method and a function of the processor firmware in any one of the foregoing embodiments.

The memory fault handling apparatus 1100 includes a processing unit 1101 and a transceiver unit 1102. For example, the transceiver unit 1102 may be configured to support communication between the processor firmware and the management module in the foregoing embodiment. The processing unit 1101 is configured to control and manage an action of the processor firmware, and is configured to perform processing performed by the processor firmware in the foregoing embodiment. Optionally, if the memory fault handling apparatus 1100 includes a storage unit, the processing unit 1101 may further execute programs or instructions stored in the storage unit, so that the memory fault handling apparatus 1100 implements the method and functions in any one of the foregoing embodiments.

For example, the processing unit 1101 may be configured to, for example, detect error information of the memory, or perform step S503 and step S506 in FIG. 5, and/or perform another process used for the technology described in this specification. The transceiver unit 1102 may be configured to, for example, send the error information of the memory to the management module, or perform step S502 and step S505 in FIG. 5, or step S502, step S505, and step S507 in FIG. 6, and/or perform another process used for the technology described in this specification. All related content of the steps in the foregoing method embodiments may be cited in function descriptions of the corresponding functional modules. Details are not described herein again.

For example, in hardware implementation, one processor may perform a function of the processing unit 1101, and a transceiver (a transmitter/a receiver) and/or a communication interface may perform a function of the transceiver unit 1102. The processing unit 1101 may be built in or independent of a processor of the memory fault handling apparatus 1100 in a hardware form, or may be stored in the storage of the memory fault handling apparatus 1100 in a software form, so that the processor invokes and performs an operation corresponding to each functional unit.

Figure 12:
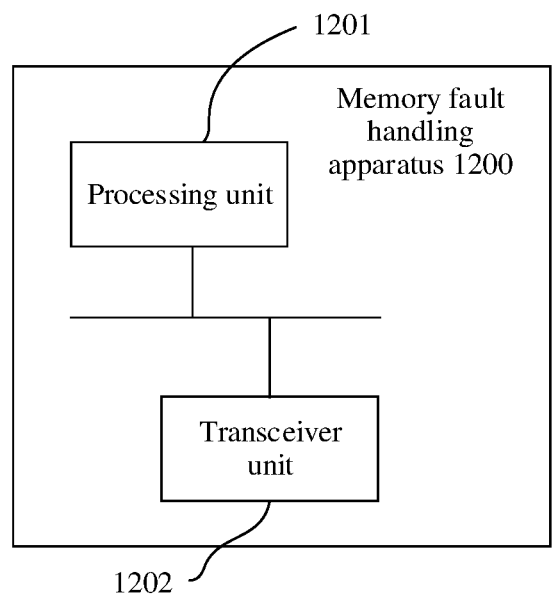
FIG. 12 is a schematic composition diagram of another memory fault handling apparatus according to an embodiment of this application.

FIG. 12 is a schematic diagram of a structure of a memory fault handling apparatus 1200. The memory fault handling apparatus may be the OS management unit. The memory fault handling apparatus 1200 may be configured to implement a method and a function of the OS management unit in any one of the foregoing embodiments.

The memory fault handling apparatus 1200 includes a processing unit 1201 and a transceiver unit 1202. For example, the transceiver unit 1202 may be configured to support communication between the OS management unit and the management module in the foregoing embodiment. The processing unit 1201 is configured to control and manage an action of the OS management unit, and is configured to perform processing performed by the OS management unit in the foregoing embodiment. Optionally, if the memory fault handling apparatus 1200 includes a storage unit, the processing unit 1201 may further execute programs or instructions stored in the storage unit, so that the memory fault handling apparatus 1200 implements the method and functions in any one of the foregoing embodiments.

For example, the processing unit 1201 may be configured to perform, for example, step S703 and step S706 in FIG. 7, and/or another process used for the technology described in this specification. The transceiver unit 1202 may be configured to perform step S702 and step S705 in FIG. 7, or step S702, step S705, and step S707 in FIG. 8, and/or another process used for the technology described in this specification. All related content of the steps in the foregoing method embodiments may be cited in function descriptions of the corresponding functional modules. Details are not described herein again.

For example, in hardware implementation, one processor may perform a function of the processing unit 1201, and a transceiver (a transmitter/a receiver) and/or a communication interface may perform a function of the transceiver unit 1202. The processing unit 1201 may be built in or independent of a processor of the memory fault handling apparatus 1200 in a hardware form, or may be stored in the storage of the memory fault handling apparatus 1200 in a software form, so that the processor invokes and performs an operation corresponding to each functional unit.

An embodiment of this application further provides a memory fault handling apparatus. The memory fault handling apparatus includes a processor, and may further include a transceiver and a storage. The transceiver is configured to send and receive information, or is configured to communicate with another communication device. The storage is configured to store computer-executable instructions. The processor is configured to execute the computer-executable instructions, to support a management module in implementing the memory fault handling method in any one of embodiments in FIG. 4 to FIG. 9.

An embodiment of this application further provides a computer-readable storage medium. The computer-readable storage medium stores instructions. When the instructions are run on a computer, the computer is enabled to perform the memory fault handling method according to any one of embodiments in FIG. 4 to FIG. 9.

An embodiment of this application further provides a computer program product. When the computer program product is run on a computer, the computer is enabled to perform the memory fault handling method in any one of embodiments in FIG. 4 to FIG. 9.

An embodiment of this application further provides a memory fault handling apparatus. The apparatus may exist in a product form of a chip. A structure of the apparatus includes a processor and an interface circuit. The processor is configured to communicate with another apparatus by using a receiver circuit, so that the apparatus performs the memory fault handling method in any one of embodiments in FIG. 4 to FIG. 9.

An embodiment of this application further provides a memory fault handling system, including a management module and processor firmware. The management module and the processor firmware may perform the memory fault handling method in FIG. 5 or FIG. 6.

An embodiment of this application further provides a memory fault handling system, including a management module and an OS management unit. The management module and the OS management unit may perform the memory fault handling method in FIG. 7 or FIG. 8.

An embodiment of this application further provides a memory fault handling system, including a management module, processor firmware, and an OS management unit. The management module, the processor firmware, and the OS management unit may perform the memory fault handling method in any one of embodiments shown in FIG. 4 to FIG. 9.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or a dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A memory fault handling method, comprising:
obtaining, by a management module, error information of a memory in an electronic device, wherein the error information includes at least one of the error information of the memory comprises at least one of a state of a corrected error (CE), occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, or a row address with a maximum quantity of memory patrol errors;

determining, by the management module, based on the error information of the memory, a fault feature mode of the memory or an isolation repair technology to repair the memory, wherein the fault feature mode comprises at least one of a page fault mode, a single-bit bit fault mode, a cell fault mode, a row fault mode, a column fault mode, a bank fault mode, a device fault mode, a rank fault mode, a channel fault mode, a dual in-line memory module (DIMM) fault mode, a fault mode in which a quantity of continuous errors occur is under a first threshold, or a fault mode in which a quantity of errors over a second threshold occur in a short period of time, wherein the first threshold is lower than the second threshold;

determining, by the management module, based on the fault feature mode of the memory or the isolation repair technology to repair the memory, to repair the memory using at least one of hardware isolation or software isolation;

sending, by the management module, based on determining to repair the memory using hardware isolation, a first fault repair request to a processor firmware; and sending, by the management module, based on determining to repair the memory using software isolation, a second fault repair request an operating system (OS) management unit.

2. The method according to claim 1, wherein:
the physical address information of the CE indicates a physical location of the CE in the memory; and
the physical address information of the uncorrected error indicates a physical location of the uncorrected error in the memory.

3. The method according to claim 1, wherein the method further comprises:
obtaining, by the management module, running status data of the memory, wherein the running status data of the memory comprises at least one of CPU usage information, temperature information, running program information, or memory health status information.

4. The method according to claim 3, wherein the determining, by the management module, based on the error information of the memory the fault feature mode of the memory or the isolation repair technology to repair the memory comprises:
determining, by the management module, based on the error information of the memory and the running status data of the memory, the fault feature mode of the memory or the isolation repair technology to repair the memory.

5. The method according to claim 1, wherein the first fault repair request requests the processor firmware to repair the memory, and the first fault repair request comprises identification of at least one of the fault feature mode of the memory or the isolation repair technology to repair the memory.

6. The method according to claim 5, wherein the method further comprises:
receiving, by the management module, a first fault repair response from the processor firmware, wherein the first fault repair response indicates a repair result obtained after the processor firmware repairs the memory.

7. The method according to claim 5, wherein the processor firmware comprises firmware, a basic input/output system (BIOS), a management engine (ME), or an intelligent management unit (IMU).

8. The method according to claim 1, wherein the method further comprises:
sending, by the management module, a first fault repair information table to the processor firmware, wherein the first fault repair information table indicates a fault feature mode and one or more hardware isolation repair technologies corresponding to the fault feature mode.

9. The method according to claim 8, wherein the hardware isolation repair technology comprises at least one of bit isolation and replacement, cell isolation and replacement, row isolation and replacement, column isolation and replacement, bank isolation and replacement, device isolation and replacement, rank isolation and replacement, channel isolation and replacement, single device data correction (SDDC), single device error correction (SDEC), adaptive double device data correction-multiple region (ADDDC-MR), adaptive data correction-single region (ADC-SR), adaptive double device error correction (ADDEC), partial cache line sparing (PCLS), adaptive cache line sparing (ACLS), hardware post-package repair (hPPR), software post-package repair (sPPR), post-package repair (PPR), or a hardware isolation repair technology for replacing a specific address range of the memory.

10. The method according to claim 1, wherein the second fault repair request requests the OS management unit to repair the memory, and wherein the second fault repair request indicates at least one of the fault feature mode of the memory or the isolation repair technology to repair the memory.

11. The method according to claim 10, wherein the method further comprises:
receiving, by the management module, a second fault repair response from the OS management unit, wherein the second fault repair response indicates a repair result obtained after the OS management unit repairs the memory.

12. The method according to claim 1, wherein the method further comprises:
sending, by the management module, a second fault repair information table to the OS management unit, wherein the second fault repair information table indicates a fault feature mode and one or more software isolation repair technologies corresponding to the fault feature mode.

13. The method according to claim 12, wherein the software isolation repair technology comprises at least one of page offline, address isolation, process isolation, or a software isolation repair technology for replacing a specific address range of the memory.

14. The method according to claim 11, wherein the OS management unit is a system management unit built in an OS or a device management agent program installed in an OS.

15. The method according to claim 1, wherein the determining, by the management module, based on the error information of the memory, the fault feature mode of the memory comprises:
determining, by the management module, the fault feature mode of the memory, based on the error information of the memory and a fault prediction model, wherein the fault prediction model predicts the fault feature mode of the memory.

16. The method according to claim 1, wherein the method further comprises:
determining, by the management module, a fault severity of the memory; and
sending, by the management module, alarm information to an upper-layer operation and maintenance system when the fault severity of the memory exceeds a preset threshold.

17. The method according to claim 16, wherein the determining, by the management module, the fault severity of the memory comprises:
determining, by the management module, the fault severity of the memory based on at least one of a first fault repair response or a second fault repair response.

18. A memory fault handling method, comprising:
sending, by processor firmware, error information of a memory in an electronic device to a management module, wherein the error information includes at least one of the error information of the memory comprises at least one of a state of a corrected error (CE), occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, or a row address with a maximum quantity of memory patrol errors;

receiving, by the processor firmware, a first fault repair request from the management module, wherein the first fault repair request requests the processor firmware to repair the memory using hardware isolation, wherein the first fault repair request comprises identification of at least one of a fault feature mode of the memory or an isolation repair technology to repair the memory, and wherein the fault feature mode comprises at least one of a page fault mode, a single-bit bit fault mode, a cell fault mode, a row fault mode, a column fault mode, a bank fault mode, a device fault mode, a rank fault mode, a channel fault mode, a dual in-line memory module (DIMM) fault mode, a fault mode in which a quantity of continuous errors occur is under a first threshold, or a fault mode in which a quantity of errors over a second threshold occur in a short period of time, wherein the first threshold is lower than the second threshold; and repairing, by the processor firmware, the memory using hardware isolation based on the isolation repair technology.

19. A non-transitory computer-readable storage medium storing a program to be executed by a processor, the program including instructions for:

obtaining error information of a memory in an electronic device, wherein the error information includes at least one of the error information of the memory comprises at least one of a state of a corrected error (CE), occurrence time of the CE, a quantity of CEs, physical address information of the CE, a state of an uncorrected error, occurrence time of the uncorrected error, a quantity of uncorrected errors, physical address information of the uncorrected error, a quantity of memory patrol errors, a row address of the memory patrol error, a column address of the memory patrol error, or a row address with a maximum quantity of memory patrol errors;

determining, based on the error information of the memory, a fault feature mode of the memory or an isolation repair technology to repair the memory, wherein the fault feature mode comprises at least one of a page fault mode, a single-bit bit fault mode, a cell fault mode, a row fault mode, a column fault mode, a bank fault mode, a device fault mode, a rank fault mode, a channel fault mode, a dual in-line memory module (DIMM) fault mode, a fault mode in which a quantity of continuous errors occur is under a first threshold, or a fault mode in which a quantity of errors over a second threshold occur in a short period of time, wherein the first threshold is lower than the second threshold;

determining, based on the fault feature mode of the memory or the isolation repair technology to repair the memory, to repair the memory using at least one of hardware isolation or software isolation;

sending, based on determining to repair the memory using hardware isolation, a first fault repair request to a processor firmware; and sending, based on determining to repair the memory using software isolation, a second fault repair request an operating system (OS) management unit.

20. The non-transitory computer-readable storage medium according to claim 19, wherein the instructions further comprise instructions for:

obtaining, running status data of the memory, wherein the running status data of the memory comprises at least one of CPU usage information, temperature information, running program information, or memory health status information.

\* \* \* \* \*